United States Patent
Nakamura

(10) Patent No.: US 12,384,700 B2
(45) Date of Patent: Aug. 12, 2025

(54) WATER TREATMENT METHOD

(71) Applicant: ORGANO CORPORATION, Tokyo (JP)

(72) Inventor: Yuki Nakamura, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 758 days.

(21) Appl. No.: 17/603,613

(22) PCT Filed: Aug. 3, 2020

(86) PCT No.: PCT/JP2020/029658
§ 371 (c)(1),
(2) Date: Oct. 14, 2021

(87) PCT Pub. No.: WO2021/044785
PCT Pub. Date: Mar. 11, 2021

(65) Prior Publication Data
US 2022/0212961 A1      Jul. 7, 2022

(30) Foreign Application Priority Data
Sep. 4, 2019  (JP) ................... 2019-161359

(51) Int. Cl.
C02F 1/44     (2023.01)
B01D 61/02    (2006.01)
B01D 61/08    (2006.01)
B01D 61/12    (2006.01)
B01D 65/08    (2006.01)

(52) U.S. Cl.
CPC ............ *C02F 1/441* (2013.01); *B01D 61/026* (2022.08); *B01D 61/08* (2013.01); *B01D 61/12* (2013.01); *B01D 65/08* (2013.01); *B01D 2317/022* (2013.01); *B01D 2317/025* (2013.01); *B01D 2317/04* (2013.01); *B01D 2317/06* (2013.01); *B01D 2321/16* (2013.01); *B01D 2321/40* (2013.01); *C02F 2209/006* (2013.01); *C02F 2209/03* (2013.01); *C02F 2209/05* (2013.01); *C02F 2209/06* (2013.01); *C02F 2301/08* (2013.01); *C02F 2303/16* (2013.01); *C02F 2303/22* (2013.01)

(58) Field of Classification Search
CPC .... B01D 61/025; B01D 61/026; B01D 61/08; B01D 61/12; B01D 65/02; B01D 65/08; B01D 2317/02; B01D 2317/022; B01D 2317/025; B01D 2317/04; B01D 2317/06; B01D 2321/16; B01D 2321/40; C02F 1/008; C02F 1/441; C02F 2209/005; C02F 2209/006; C02F 2209/03; C02F 2209/05; C02F 2209/40; C02F 2301/08; C02F 2303/16; C02F 2303/22; C02F 2209/06; Y02A 20/131
See application file for complete search history.

(56) References Cited

U.S. PATENT DOCUMENTS

| | | |
|---|---|---|
| 2011/0147309 A1 | 6/2011 | Palacios Doñaque et al. |
| 2015/0144559 A1 | 5/2015 | Taniguchi et al. |
| 2016/0002072 A1 | 1/2016 | Tokunaga et al. |
| 2019/0224624 A1* | 7/2019 | Kitamura ............ B01D 61/08 |

FOREIGN PATENT DOCUMENTS

| | | |
|---|---|---|
| CN | 102895878 A | 1/2013 |
| CN | 107879524 A | 4/2018 |
| CN | 109289538 A | 2/2019 |
| CN | 109843416 A | 6/2019 |
| JP | 11-290849 A | 10/1999 |
| JP | 2004-261724 A | 9/2004 |
| JP | 2004-321869 A | 11/2004 |
| JP | 2005-169372 A | 6/2005 |
| JP | 2007-14902 A | 1/2007 |
| JP | 2016-87500 A | 5/2016 |
| JP | 2017-209654 A | 11/2017 |
| TW | 200732030 A | 9/2007 |
| WO | 2013/176119 A1 | 1/2016 |

OTHER PUBLICATIONS

International Search Report issued in International Patent Application No. PCT/JP2020/029658, dated Sep. 24, 2020, along with an English translation thereof.
Office Action issued to Chinese Patent Application No. 202080012978.3 dated Sep. 1, 2022, along with English translation thereof.
Office Action issued Mar. 12, 2024 in Taiwanese family member Patent Application No. 109127856, with English language translation thereof.

* cited by examiner

*Primary Examiner* — Ryan B Huang
*Assistant Examiner* — Tak L Chiu
(74) *Attorney, Agent, or Firm* — Greenblum & Bernstein, P.L.C.

(57) ABSTRACT

A water treatment system including: a reverse osmosis membrane device A for treating a water to be treated; a reverse osmosis membrane device E for treating permeated water from device A; a reverse osmosis membrane device B for treating concentrated water from device A or E; a reverse osmosis membrane device C for treating concentrated water from device E or A; and each of water flow lines through which the concentrated water and permeated water from devices A to E respectively flow downstream, wherein the connections of each of the water flow lines are switchable so that while the concentrated water from device E flows to device B to wash device B, the concentrated water from device A is treatable by device C, and while the concentrated water from device E flows to device C to wash device C, the concentrated water from device A is treatable by device B.

4 Claims, 4 Drawing Sheets

WATER TREATMENT METHOD

FIELD OF THE INVENTION

The present invention relates to a water treatment system and a water treatment method.

BACKGROUND OF THE INVENTION

In a water treatment using a reverse osmosis membrane (RO membrane), scaling that clogs the RO membrane due to precipitation of dissolved salts and the like in the water to be treated on the surface of a concentrated water side of the RO membrane causes a problem. As a technology for suppressing scaling, it is widely known to add a pH adjusting agent to the water to be treated or to add a scale dispersant that suppresses scale generation (see, for example, Patent Literature 1).

On the other hand, a method of washing the scale generated on the RO membrane surface by utilizing RO membrane-permeated water is known. For example, Patent Literature 2 discloses that backwashing is performed by causing permeated water to flow from the permeated water side of an RO membrane in order to suppress silica scale. Furthermore, Patent Literature 3 discloses a method of changing the flow direction of the water to be treated in a membrane module regularly or irregularly. Moreover, Patent Literature 4 discloses that in an RO membrane device having RO membrane banks installed in multiple stages, permeated water is passed through an RO membrane bank in each stage from the concentrated side to wash the RO membrane bank in each stage.

CITATION LIST

Patent Literatures

Patent Literature 1: JP-A-2005-169372 ("JP-A" means an unexamined published Japanese patent application)
Patent Literature 2: JP-A-11-290849
Patent Literature 3: JP-A-2004-261724
Patent Literature 4: JP-A-2017-209654

SUMMARY OF THE INVENTION

Technical Problem

Even if a pH adjusting agent or a scale dispersant is added to raw water (water to be treated), scaling on an RO membrane surface may not be sufficiently suppressed due to defective injection of chemicals, fluctuations in the properties of the raw water, and the like. As described in Patent Literatures 3 and 4, scale generated on an RO membrane surface can be washed and removed by passing low-total dissolved solids (TDS) water such as permeated water of an RO membrane device through the RO membrane. However, the methods described in these Patent Literatures require that normal operation of RO membrane devices should be stopped for washing. Furthermore, the RO membrane-permeated water provided for washing is discharged out of the system. Therefore, in the washing methods described in the above-described Patent Literatures, it is necessary to stop normal operation during washing, and it is premised that the permeated water used for washing is discharged out of the system, so that the driving efficiency of the RO membrane device or the recovery rate is lowered.

Thus, the present invention provides a water treatment system and a water treatment method, which can wash and remove the scale generated on an RO membrane surface without stopping an RO membrane treatment of raw water by the water treatment system and without discharging the water provided for washing out of the system.

Solution to Problem

The above-described problems of the present invention have been solved by the following means.
[1]
A water treatment system including:
  a reverse osmosis membrane device A for treating a water to be treated;
  a reverse osmosis membrane device E for treating permeated water from the reverse osmosis membrane device A;
  a reverse osmosis membrane device B for treating concentrated water from the reverse osmosis membrane device A or concentrated water from the reverse osmosis membrane device E;
  a reverse osmosis membrane device C for treating the concentrated water from the reverse osmosis membrane device E when the reverse osmosis membrane device B is treating the concentrated water from the reverse osmosis membrane device A, and for treating the concentrated water from the reverse osmosis membrane device A when the reverse osmosis membrane device B is treating the concentrated water from the reverse osmosis membrane device E;
  a concentrated water flow line AB connecting a concentrated water side of the reverse osmosis membrane device A with a supply side of the reverse osmosis membrane device B;
  a concentrated water flow line AC connecting the concentrated water side of the reverse osmosis membrane device A with a supply side of the reverse osmosis membrane device C;
  a concentrated water flow line EB connecting a concentrated water side of the reverse osmosis membrane device E with the supply side of the reverse osmosis membrane device B;
  a concentrated water flow line EC connecting the concentrated water side of the reverse osmosis membrane device E with the supply side of the reverse osmosis membrane device C;
  a raw water return line LF1 connecting a concentrated water side and a permeated water side of the reverse osmosis membrane device B with a raw water tank storing the water to be treated;
  a raw water return line LF2 connecting a concentrated water side and a permeated water side of the reverse osmosis membrane device C with the raw water tank storing the water to be treated;
  a permeated water return line BE connecting the permeated water side of the reverse osmosis membrane device B with a supply side of the reverse osmosis membrane device E; and
  a permeated water return line CE connecting the permeated water side of the reverse osmosis membrane device C with the supply side of the reverse osmosis membrane device E,
  wherein a first connection line passing water to the concentrated water flow line AB and the concentrated water flow line EC and a second connection line passing water to the concentrated water flow line AC and the concentrated water flow line EB are switchable to each other, and wherein a third connection line passing water to the permeated water return line BE and the raw water return line LF2 at the time of using the first connection line and a fourth connection line passing water to the raw water return line LF1 and the permeated water return line CE at the time of using the second connection line are switchable to each other, in response to switching between the first connection line and the second connection line.

[2]

A water treatment system including:

a reverse osmosis membrane device A for treating a water to be treated;

a reverse osmosis membrane device E for treating permeated water from the reverse osmosis membrane device A;

a reverse osmosis membrane device B for treating concentrated water from the reverse osmosis membrane device A or concentrated water from the reverse osmosis membrane device E;

a reverse osmosis membrane device C for treating the concentrated water from the reverse osmosis membrane device E when the reverse osmosis membrane device B is treating the concentrated water from the reverse osmosis membrane device A, and for treating the concentrated water from the reverse osmosis membrane device A when the reverse osmosis membrane device B is treating the concentrated water from the reverse osmosis membrane device E;

a concentrated water flow line AB connecting a concentrated water side of the reverse osmosis membrane device A with a supply side of the reverse osmosis membrane device B;

a concentrated water flow line AC connecting the concentrated water side of the reverse osmosis membrane device A with a supply side of the reverse osmosis membrane device C;

a concentrated water flow line EB connecting a concentrated water side of the reverse osmosis membrane device E with the supply side of the reverse osmosis membrane device B;

a concentrated water flow line EC connecting the concentrated water side of the reverse osmosis membrane device E with the supply side of the reverse osmosis membrane device C;

a raw water return line LF3 connecting a concentrated water side of the reverse osmosis membrane device B with a raw water tank storing the water to be treated;

a raw water return line LF4 connecting a concentrated water side of the reverse osmosis membrane device C with the raw water tank storing the water to be treated;

a permeated water return line BE connecting a permeated water side of the reverse osmosis membrane device B with a supply side of the reverse osmosis membrane device E; and a permeated water return line CE connecting a permeated water side of the reverse osmosis membrane device C with the supply side of the reverse osmosis membrane device E, wherein a first connection line passing water to the concentrated water flow line AB and the concentrated water flow line EC and a second connection line passing water to the concentrated water flow line AC and the concentrated water flow line EB are switchable to each other, and wherein a fifth connection line passing water to the raw water return line LF4 at the time of using the first connection line and a sixth connection line passing water to the raw water return line LF3 at the time of using the second connection line are switchable to each other, in response to switching between the first connection line and the second connection line.

[3]

The water treatment system described in [1] or [2], having:

a measuring unit for measuring any one or more of pressure, electrical conductivity, ion concentration, pH, and amount of permeated water for any one or more of supplied water, concentrated water, and permeated water of the reverse osmosis membrane device B and/or the reverse osmosis membrane device C;

a computation unit for calculating changes over time and/or a difference in the value measured by the measuring unit; and a control unit for controlling switching of the lines based on the numerical values calculated by the computation unit.

[4]

A water treatment system including:

a reverse osmosis membrane device A for treating a water to be treated;

a reverse osmosis membrane device E for treating permeated water from the reverse osmosis membrane device A;

X units of a reverse osmosis membrane device B for treating concentrated water from the reverse osmosis membrane device A and concentrated water from the reverse osmosis membrane device E;

concentrated water flow lines AB connecting a concentrated water side of the reverse osmosis membrane device A with supply sides of the X units of the reverse osmosis membrane device B;

concentrated water flow lines EB connecting a concentrated water side of the reverse osmosis membrane device E with the supply sides of the X units of the reverse osmosis membrane device B;

raw water return lines LF connecting concentrated water sides of the X units of the reverse osmosis membrane device B with a raw water tank storing the water to be treated; and permeated water return lines BE connecting permeated water sides of the X units of the reverse osmosis membrane device B with a supply side of the reverse osmosis membrane device E, wherein connection lines I passing water to a concentrated water flow line $EB^X$ selected from the X units of the concentrated water flow lines EB, and the concentrated water flow lines AB connected to the supply sides of reverse osmosis membrane devices B other than the reverse osmosis membrane device B connected to the concentrated water flow line $EB^X$, are sequentially switchable, wherein in the reverse osmosis membrane devices B to which the concentrated water from the reverse osmosis membrane device A is supplied, a connection line II passing water to the permeated water return line BE is selected, and wherein in the reverse osmosis membrane devices B to which the concentrated water from the reverse osmosis membrane device E is supplied, a connection line III passing water to the raw water return line LF is selected.

[5]

The water treatment system described in [4], having:
a measuring unit for measuring any one or more of pressure, electrical conductivity, ion concentration, pH, and amount of permeated water for any one or more of supplied water, concentrated water, and permeated water of the reverse osmosis membrane devices B;
a computation unit for calculating changes over time and/or a difference in the value measured by the measuring unit; and
a control unit for controlling switching of the lines based on the numerical values calculated by the computation unit.

[6]

The water treatment system described in [3] or [5], having:
a chemical adding unit for adding a washing chemical to the permeated water of the reverse osmosis membrane device A and/or the concentrated water of the reverse osmosis membrane device E,
wherein the control unit also has a function of controlling the amount of addition of the washing chemical based on the calculated numerical values.

[7]

A water treatment method, including removing a scale generated on a surface of a reverse osmosis membrane of a reverse osmosis membrane device B by the following water treatment (a1), by switching the water treatment (a1) to the following water treatment (b1):

<Water Treatment (a1)>
a water to be treated is treated by a reverse osmosis membrane device A,
concentrated water from the reverse osmosis membrane device A is treated by a reverse osmosis membrane device B,
permeated water from the reverse osmosis membrane device A is treated by a reverse osmosis membrane device E, and
concentrated water from the reverse osmosis membrane device E is treated by a reverse osmosis membrane device C; and <Water Treatment (b1)>
a water to be treated is treated by a reverse osmosis membrane device A,
concentrated water from the reverse osmosis membrane device A is treated by a reverse osmosis membrane device C,
permeated water from the reverse osmosis membrane device A is treated by a reverse osmosis membrane device E, and
concentrated water from the reverse osmosis membrane device E is treated by a reverse osmosis membrane device B.

[8]

The water treatment method described in [7], wherein the water treatments (a1) and (b1) are alternately repeated.

[9]

A water treatment method, including removing a scale generated on a surface of a reverse osmosis membrane of a reverse osmosis membrane device $B^{X2}$ by a water treatment including the following water treatment (a2), by switching the water treatment (a2) to the following water treatment (b2):

<Water Treatment (a2)>
a water to be treated is treated by a reverse osmosis membrane device A,
permeated water from the reverse osmosis membrane device A is treated by a reverse osmosis membrane device E,
concentrated water from the reverse osmosis membrane device E is treated by a reverse osmosis membrane device $B^{X1}$ selected from X units of a reverse osmosis membrane device B, and
concentrated water from the reverse osmosis membrane device A is treated by a reverse osmosis membrane device B other than the reverse osmosis membrane device $B^{X1}$; and <Water Treatment (b2)>
a water to be treated is treated by a reverse osmosis membrane device A,
permeated water from the reverse osmosis membrane device A is treated by a reverse osmosis membrane device E,
concentrated water from the reverse osmosis membrane device E is treated by a reverse osmosis membrane device $B^{X2}$ that is selected from X units of the reverse osmosis membrane device B and is different from the reverse osmosis membrane device $B^{X1}$, and
concentrated water from the reverse osmosis membrane device A is treated by a reverse osmosis membrane device B other than the reverse osmosis membrane device $B^{X2}$.

[10]

The water treatment method described in [9], wherein the scale generated on the surface of the reverse osmosis membrane of the reverse osmosis membrane devices B by supplying the concentrated water from the reverse osmosis membrane device A, is sequentially removed by passing the concentrated water from the reverse osmosis membrane device E, by sequentially switching the reverse osmosis membrane devices B to which the concentrated water from the reverse osmosis membrane device E is supplied.

Advantageous Effects of Invention

According to the water treatment system and the water treatment method of the present invention, scale generated on the surface of an RO membrane can be washed and removed without stopping an RO membrane treatment of raw water and without discharging the water provided for washing out of the system. As a result, water treatment can be carried out efficiently.

DESCRIPTION OF EMBODIMENTS

[Water Treatment System]

A preferred embodiment (first embodiment) of the water treatment system according to the present invention will be described with reference to FIG. 1.

Figure 1:
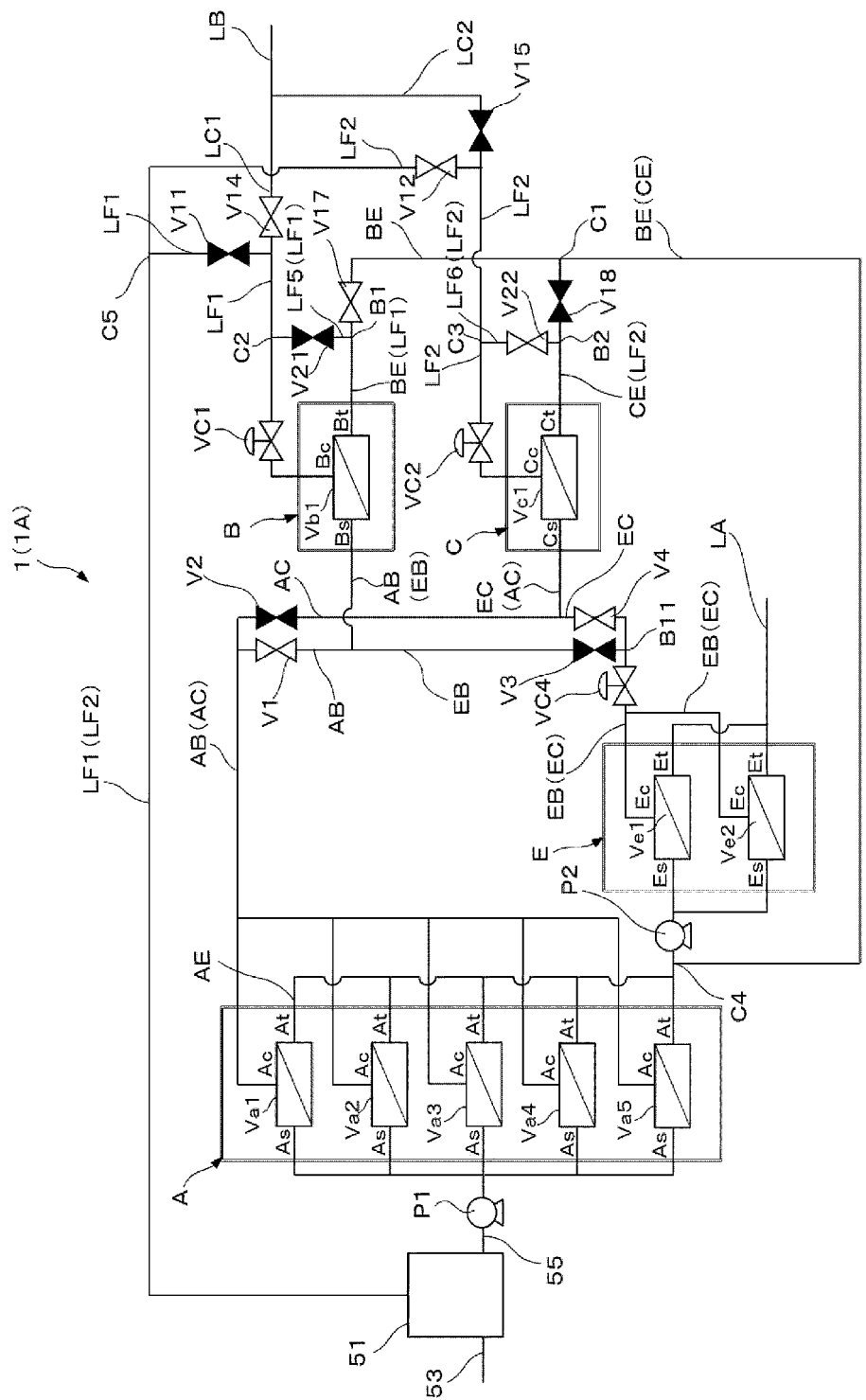
FIG. 1 is a schematic configuration diagram illustrating a preferred embodiment (first embodiment) of a water treatment system according to the present invention.

As illustrated in FIG. 1, a water treatment system 1 (1A) includes a reverse osmosis membrane device A for treating a water to be treated; a reverse osmosis membrane device E for treating permeated water from the reverse osmosis membrane device A; and a plurality of reverse osmosis membrane devices (in the embodiment illustrated in FIG. 1, reverse osmosis membrane device B and reverse osmosis membrane device C) for treating concentrated water from the reverse osmosis membrane device A or concentrated water from the reverse osmosis membrane device E. Hereinafter, the "reverse osmosis membrane device" is also referred to as "RO membrane device".

It is preferable that this water treatment system 1A includes a raw water tank 51 in which raw water as a water to be treated is stored. It is preferable that a tank supply line 53 through which raw water is supplied is connected to the raw water tank 51, and a supply side As of the RO membrane device A is connected thereto through the raw water supply line 55. It is preferable that a first pump P1 is disposed as a liquid feeding pump at the raw water supply line 55. Therefore, the water to be treated (raw water) stored in the raw water tank 51 is supplied by the first pump P1 by applying pressure to each of supply sides As of the RO membrane device A. The term "line" according to the present invention means a flow channel through which water passes.

In the water treatment system 1 (1A), a concentrated water flow line AB (hereinafter, also referred to as line AB) connecting the concentrated water side Ac of the RO membrane device A with the supply side Bs of the RO membrane device B is disposed. Furthermore, a concentrated water flow line AC (hereinafter, also referred to as line AC) connecting the concentrated water side Ac of the RO membrane device A with the supply side Cs of the RO membrane device C is disposed. Moreover, a permeated water flow line AE (hereinafter, also referred to as line AE) connecting the permeated water side At of the RO membrane device A with the supply side Es of the RO membrane device E is disposed.

A concentrated water flow line EB (hereinafter, also referred to as line EB) connecting a concentrated water side Ec of the RO membrane device E with the supply side Bs of the RO membrane device B is disposed. Furthermore, a concentrated water flow line EC (hereinafter, also referred to as line EC) connecting the concentrated water side Ec of the RO membrane device E with the supply side Cs of the RO membrane device C is disposed.

In the line configuration illustrated in the diagram, a portion of the line AB and a portion of the line AC are shared. Furthermore, a portion of the line AB and a portion of the line EB are shared at the supply side Bs side, and a portion of the line AC and a portion of the line EC are shared on the side of the supply side Cs. Moreover, a portion of the line EB and a portion of the line EC are shared on the side of the concentrated side Ec. Any of the lines may be a single line or may be a line that is partially shared.

Furthermore, it is preferable that the permeated water side Et of the RO membrane device E is connected to a water treatment line LA.

The water treatment system 1A is configured such that a first connection line that passes water through the line AB and passes water through the line AE and line EC, and a second connection line that passes water through the line AC and passes water through the line AE and line EB, can be alternately switched.

The phrase "a first connection line and a second connection line are alternately switched" has the following meaning. That is, the concentrated water side Ac of the RO membrane device A and the supply side Bs of the RO membrane device B are connected by the line AB of the first connection line. At this time, the permeated water side At of the RO membrane device A and the supply side Es of the RO membrane device E are connected by the line AE, and the concentrated water side Ec of the RO membrane device E and the supply side Cs of the RO membrane device C are connected by the line EC.

Then, by switching the lines, the permeated water side At of the RO membrane device A and the supply side Es of the RO membrane device E are connected by the line AE of the second connection line, and the concentrated water side Ec of the RO membrane device E and the supply side Bs of the RO membrane device B are connected by the line EB. At this time, the concentrated water side Ac of the RO membrane device A and the supply side Cs of the RO membrane device C are connected by the line AC.

Then, by switching the second connection line to the first connection line, the connection can be returned to the connection of the first connection line. As such, the first connection line and the second connection line can be alternately switched.

The above-described switching between the first connection line and the second connection line can be carried out by, for example, a valve operation. For example, it is preferable that a gate valve V1 is disposed on the line AB that is connected to the RO membrane device B, and a gate valve V2 is disposed on the line AC that is connected to the RO membrane device C. Furthermore, it is preferable that a gate valve V3 is disposed on the line EB that is connected to the RO membrane device B, and a gate valve V4 is disposed on the line EC that is connected to the RO membrane device C.

In the line EB (EC), it is preferable that a control valve VC4 is disposed between each of the concentrated water sides Ec of the RO membrane device E and a branch point B11 that is branched to each of the RO membrane devices B. The flow rate of concentrated water from the RO membrane device E is controlled by this control valve VC4.

By appropriately opening and closing the above-described gate valves V1 to V4, for example, in the RO membrane device B, the first connection line of the line AB and the second connection line of the line AE and the line EB become switchable. Similarly, also in the RO membrane device C, the first connection line and the second connection line become switchable.

As an example, on the line AB that is connected to the RO membrane device B, a pipe connecting the concentrated water side Ac of the RO membrane device A and the supply side Bs of the RO membrane device B is used, and the gate valve V1 is disposed in this pipe. On the line AC that is connected to the RO membrane device C, a pipe connecting the concentrated water side Ac of the RO membrane device A and the supply side Cs of the RO membrane device C is used, and the gate valve V2 is disposed in this pipe. On the line EB that is connected to the RO membrane device B, a pipe connecting the concentrated water side Ec of the RO membrane device E and the supply side Bs of the RO membrane device B is used, and the gate valve V3 is disposed in this pipe. On the line EC that is connected to the RO membrane device C, a pipe connecting the concentrated water side Ec of the RO membrane device E and the supply side Cs of the RO membrane device C is used, and the gate valve V4 is disposed in this pipe.

The first connection line can be opened up by opening the gate valves V1 and V4, and the second connection line can be shut off by closing the gate valves V2 and V3. Furthermore, as a result of switching of the connection lines, the first connection line can be shut off by closing the gate valves V1 and V4, and the second connection line can be opened up by opening the gate valves V2 and V3. Switching between the first connection line and the second connection line can be carried out alternately and repeatedly by repeatedly performing the above-described valve operation.

By switching between the first connection line and the second connection line, the line EB of the second connection line is connected to the RO membrane device B in which scaling has proceeded due to the connection of the first connection line. As a result, concentrated water from the RO membrane device E obtained by treating permeated water from the RO membrane device A (although this is concentrated water, since it is a concentrated water obtained by treating the permeated water from the RO membrane device A, it is suitable as water for washing) is supplied to the RO membrane device B. As a result, the scale generated on the RO membrane surface of the RO membrane device B is gradually dissolved by this concentrated water, and the RO membrane device B is washed. On the other hand, since the concentrated water from the RO membrane device A is supplied to the RO membrane device C, scaling proceeds in the RO membrane device C. Then, for example, after a certain period of time elapses, the second connection line and the first connection line are further switched. It is preferable that this switching is carried out before the scale of the RO membrane device B is removed to a desired level by the action of concentrated water and the RO membrane device C becomes non-functional due to the scale.

The connection is returned to the original connection of the first connection line by further switching of the above-described connection lines (two times of switching). That is, concentrated water from the RO membrane device A is supplied to the supply side Bs of the RO membrane device B that has been washed by concentrated water from the RO membrane device E. On the other hand, the concentrated water from the RO membrane device E obtained by treating the permeated water from the RO membrane device A (although this is concentrated water, since it is a concentrated water obtained by treating the permeated water from the RO membrane device A, it is suitable as water for washing) is supplied to the supply side Cs of the RO membrane device C. As a result, the scale in the RO membrane device C is gradually dissolved by the supplied concentrated water, and the RO membrane device C is washed. On the other hand, the concentrated water from the RO membrane device A is further treated by the RO membrane device B, and scaling proceeds in the RO membrane device B.

By performing switching of the connection lines as such, the scale generated on the RO membrane surface can be removed in a timely manner by the concentrated water from the RO membrane device E obtained by treating the permeated water from the RO membrane device A, without stopping the RO membrane treatment of raw water.

A more detailed configuration than that of the above-described water treatment system 1 will be described with reference to FIG. 1.

The RO membrane devices A, B, C, and E are disposed as described above.

In the RO membrane device A, a reverse osmosis membrane bank (hereinafter, referred to as bank) is composed of a plurality of units (five units in the illustrated example) of a reverse osmosis membrane vessel (hereinafter, referred to as vessel) Va1 to Va5 disposed in parallel. In each of the vessels Va1 to Va5, usually, it is preferable that a plurality of units of an RO membrane element (not illustrated in the diagram; hereinafter, referred to as element) are disposed in series.

In the RO membrane device B, a bank is composed of one unit or a plurality of units (one unit in the illustrated example) of vessel Vb1. In each of the vessels Vb1, it is preferable that a plurality of units of the element (not illustrated in the diagram) are disposed in series.

In the RO membrane device C, a bank is composed of one unit or a plurality of units (one unit in the illustrated example) of vessel Vc1. In each of the vessels Vc1, it is preferable that a plurality of units of the element (not illustrated in the diagram) are disposed in series in each vessel.

The elements may be of any type such as a spiral type, a hollow fiber type, a tubular type, or a flat plate type.

Incidentally, the number of elements disposed in each of the vessels may be one. The number of elements is appropriately determined by the throughput of supplied water supplied to the vessel.

In the embodiment illustrated in the diagram, the concentrated water side Bc of the RO membrane device B is connected to a raw water tank 51 by a raw water return line LF1 (hereinafter, also referred to as line LF1) in which a control valve VC1, which is a pressure adjusting valve, and a gate valve V11 are disposed in this order from the concentrated water side Bc. The concentrated water side Cc of the RO membrane device C is connected to the raw water tank 51 by a raw water return line LF2 (hereinafter, also referred to as line LF2) in which a control valve VC2, which is a pressure adjusting valve, and a gate valve V12 are disposed in this order from the concentrated water side Cc. The raw water return line LF2 may join the raw water return LF1 as illustrated in the diagram and then be connected to the raw water tank 51. Alternatively, the line LF1 and the line LF2 may be singly and each independently connected to the raw water tank 51.

It is preferable that a line LC1 is branched from the line LF1 between the control valve VC1 and the gate valve V11 and is connected to a blow line LB. Furthermore, it is preferable that a line LC2 is branched from the line LF2 between the control valve VC2 and the gate valve V12 and is connected to the blow line LB. It is preferable that a gate valve V14 is disposed on the line LC1, and it is preferable that a gate valve V15 is disposed on the line LC2.

On the other hand, the permeated water side Bt of the RO membrane device B is connected to the supply side Es of the RO membrane device E through a permeated water flow line BE (hereinafter, also referred to as line BE). Similarly, the permeated water side Ct of the RO membrane device C is connected to the supply side Es of the RO membrane device E through a permeated water flow line CE (hereinafter, also referred to as line CE). The lines BE and CE may be single lines; however, as illustrated in the diagram, the line CE may join the line BE in the middle and be connected to the supply side Es of the RO membrane device E.

It is preferable that on the line BE, a gate valve 17 is disposed between a confluence C1 with the line CE and the RO membrane device B, and on the line CE, a gate valve 18 is disposed between the confluence C1 with the line BE and the RO membrane device C.

Furthermore, the line LF1 is disposed such that the permeated water side Bt of the RO membrane device B communicates with the raw water tank 51. It is preferable that the line LF1 from the permeated water side Bt is shared with the line BE from the permeated water side Bt to the branch point B1 in front of the gate valve V17 and is connected to the line LF1 from the concentrated water side Bc by the line LF5 branched from the branch point B1 at the confluence C2 between the control valve VC1 and the gate valve V11. As a result, the line LF1 is also connected to the permeated water side Bt of the RO membrane device B. It is preferable that a gate valve V21 is disposed on this line LF5. Furthermore, the line LF2 is disposed such that the permeated water side Ct of the RO membrane device C communicates with the raw water tank 51.

It is preferable that the line LF2 from the permeated water side Ct is shared with the line CE from the permeated water side Ct to the branch point B2 in front of the gate valve V18 and is connected to the line LF2 from the concentrated water side Cc by the line LF6 branched from the branch point B2 at the confluence C3 between the control valve VC2 and the gate valve V12. As a result, the line LF2 is also connected to the permeated water side Ct of the RO membrane device C. It is preferable that a gate valve V22 is disposed on this line LF6.

Furthermore, check valves (not illustrated in the diagram) that prevent inflow of the permeated water from the RO membrane devices B and C to the concentrated water sides Bc and Cc of the RO membrane devices B and C may be disposed between the control valve VC1 of the line LF1 and the confluence C2 and between the control valve VC2 of the line LF2 and the confluence C3.

Moreover, it is preferable that on the line AE, a second pump P2 is disposed between a confluence C4 between the line AE and the line BE and the supply side Es of the RO membrane device E.

The treated water line LA is, for example, a line through which water that has permeated twice through an RO membrane device and has attained a certain level of purity or higher flows. Regarding this water, although it depends on the purpose of use, for example, it is preferable that the electrical conductivity is 20 μS/cm or less and the ion concentration is 10 ppm or less.

The blow line LB is a line that supplies a concentrated water obtained by further supplying the concentrated water obtained by a treatment using an RO membrane to another RO membrane.

With regard to the valve operation and water flow of the water treatment system 1A, the details will be described below.

In the case of the first connection line, with regard to the embodiment illustrated in FIG. 1, gate valves V1, V4, V12, V14, V17, and V22, which are drawn as outlined symbols, are opened, and gate valves V2, V3, V11, V15, V18, and V21, which are drawn as black symbols, are closed. In this state, raw water in the raw water tank 51 is supplied to the RO membrane device A (first stage bank) by the first pump P1 and is treated by each of the vessels Va1 to Va5.

Concentrated water is obtained from each concentrated water side Ac of each of the vessels Va1 to Va5 of the RO membrane device A, and this concentrated water is supplied to the supply side Bs of the RO membrane device B through the line AB. It is preferable that water is treated by the RO membrane device B, and the concentrated water obtained by treating is sent from the concentrated water side Bc of the vessel Vb1 to the blow line LB through the line LF1 and the line LC1. At this time, the control valve VC1 is a valve for adjusting the pressure applied to the RO membrane device and functions as a backpressure valve. For example, with regard to the embodiment illustrated in FIG. 1, in a case where the concentrated water from the RO membrane device A is supplied to the RO membrane device B and the concentrated water from the RO membrane device E is supplied to the RO membrane device C, the pressure applied to the respective concentrated sides of the RO membrane device A and the RO membrane device B is controlled by the degree of opening of the control valve VC1. Accordingly, pressure is adjusted by the above-described degree of opening of the control valve VC1 such that the total amount of permeated water from the RO membrane device A and the RO membrane device B is a predetermined flow rate. During the above-described operation, it is preferable to have the control valve VC2 fully opened.

On the other hand, the permeated water obtained by a treatment by the RO membrane device B is sent from the permeated water side Bt of the vessel Vb1 to the second pump P2 through the line BE and is further supplied to the RO membrane device E. At the second pump P2, it is preferable that a pressure higher than atmospheric pressure is applied to the supply side Es of the RO membrane device E. For example, although it depends on the type of the RO membrane of the RO membrane device E, it is usually preferable to apply a pressure of about 0.5 to 4 MPa.

Furthermore, permeated water is obtained from each of the permeated water side At of the RO membrane device A, and this permeated water is supplied to the RO membrane device E from the line AE. The concentrated water obtained by the treatment by the RO membrane device E is supplied to the supply side Cs of the RO membrane device C through the line EC connected to the concentrated water side Ec.

The pressure of the permeated water supplied to the RO membrane device E through the line AE is almost atmospheric pressure. Thus, it is preferable that the pressure of the permeated water is adjusted to a pressure higher than atmospheric pressure by the second pump P2 and then the permeated water is supplied to the RO membrane device E by feeding through the line AE. Although it depends on the type of the RO membrane of the RO membrane device E, usually it is preferable to feed the permeated water after adjusting the pressure to a pressure of about 0.5 to 4 MPa, in the same manner as described above.

On the other hand, the permeated water treated by the RO membrane device E is supplied to the water treatment line LA connected to the permeated water side Et.

The concentrated water obtained after being treated at the RO membrane device C where the concentrated water from the RO membrane device E has been supplied is supplied from the concentrated water side Bc to the raw water tank 51 through the line LF2 and the line LF1. Furthermore, the concentrated water from the permeated water side Ct of the RO membrane device C joins the line LF1 at the confluence C5 through the LF2 (including the line CE and the line LF6) and is supplied to the raw water tank 51. In this case, it is preferable that the liquid feeding pressure of the concentrated water is adjusted by controlling the liquid feeding pressure of the concentrated water by means of the control valve VC2 so that the permeated water can join the concentrated water of the line LF2 of the concentrated water side Cc. When the RO membrane device C is washed using the concentrated water from the RO membrane device E as such, the permeated water and the concentrated water from the RO membrane device C can be returned together to the raw water tank 51.

In the case of the second connection line, with regard to the embodiment illustrated in FIG. 1, gate valves V1, V4, V12, V14, V17, and V22, which are drawn as outlined symbols, are closed, and gate valves V2, V3, V11, V15, V18, and V21, which are drawn as black symbols, are opened. In this state, raw water in the raw water tank 51 is supplied to the RO membrane device A by the first pump P1 and is treated by each of the vessels Va1 to Va5.

Permeated water is obtained from the permeated water side At of the RO membrane device A, and this permeated water is supplied to the RO membrane device E from the line AE. The concentrated water treated by the RO membrane device E is supplied to the supply side Bs of the RO membrane device B through the line EB connected to the concentrated water side Ec.

Specifically, the permeated water obtained from each of the permeated water sides At of the RO membrane device A is supplied to the RO membrane device E through the line AE in the same manner as in the above-described case of the first connection line. At this time, since the pressure of the permeated water is almost atmospheric pressure, it is preferable that the permeated water is supplied to the RO membrane device E by feeding the permeated water through the line AE by the second pump P2 at a pressure higher than atmospheric pressure. Although it depends on the type of the RO membrane of the RO membrane device E, usually it is preferable to adjust the pressure to a pressure of about 0.5 to 4 MPa in the same manner as described above.

On the other hand, the permeated water treated by the RO membrane device E is supplied to the water treatment line LA connected to the permeated water side Et.

The concentrated water obtained after being treated at the RO membrane device B where the concentrated water from the RO membrane device E has been supplied is returned from the concentrated water side Bc to the raw water tank 51 through the line LF1. Furthermore, the permeated water obtained at the RO membrane device B is returned from the permeated water side Bt to the raw water tank 51 through the line LF1 (including the line BE and the line LF5). At this time, it is preferable to adjust the liquid feeding pressure of the concentrated water to be almost equal to the liquid feeding pressure of the permeated water by controlling the liquid feeding pressure of the concentrated water from the RO membrane device B by means of the control valve VC1, such that the permeated water from the RO membrane device B can join the concentrated water of the line LF1 of the concentrated water side Bc. In a case where the RO membrane device B is washed using the concentrated water from the RO membrane device E as such, the permeated water and the concentrated water from the RO membrane device B can be returned together to the raw water tank 51.

In the water treatment system 1A, a third connection line that passes water through the permeated water return line BE and the raw water return line LF2 at the time of using the first connection line, and a fourth connection line that passes water through the raw water return line LF1 and the permeated water return line CE at the time of using the second connection line, can be switched in response to the switching between the first connection line and the second connection line.

The concentrated water obtained after being treated by the RO membrane device C, to which the concentrated water from the RO membrane device A has been supplied, is supplied to the blow line LB through the line LC2. On the other hand, the permeated water obtained by a treatment by this RO membrane device C is sent to the supply side Es of the RO membrane device E. Specifically, the permeated water from the RO membrane device C is supplied from the permeated water side Ct thereof to the suction side of the second pump P2 through the line CE (BE), has the liquid feeding pressure increased by the second pump P2, and is supplied to the RO membrane device E.

Therefore, only the respective concentrated waters from the RO membrane devices B and C obtained by treating the concentrated water from the RO membrane device A are discharged to the blow line LB. Furthermore, the respective permeated waters from the RO membrane devices B and C obtained by treating the concentrated water from the RO membrane device A, and the respective permeated waters and concentrated waters from the RO membrane devices B and C obtained by treating the concentrated water from the RO membrane device E are returned to the raw water tank 51 or the supply side Es of the RO membrane device E. Therefore, the intended high-purity water can be obtained at a high recovery rate.

Next, another preferred embodiment of the water treatment system according to the present invention (second embodiment) will be described with reference to FIG. 2.

Figure 2:
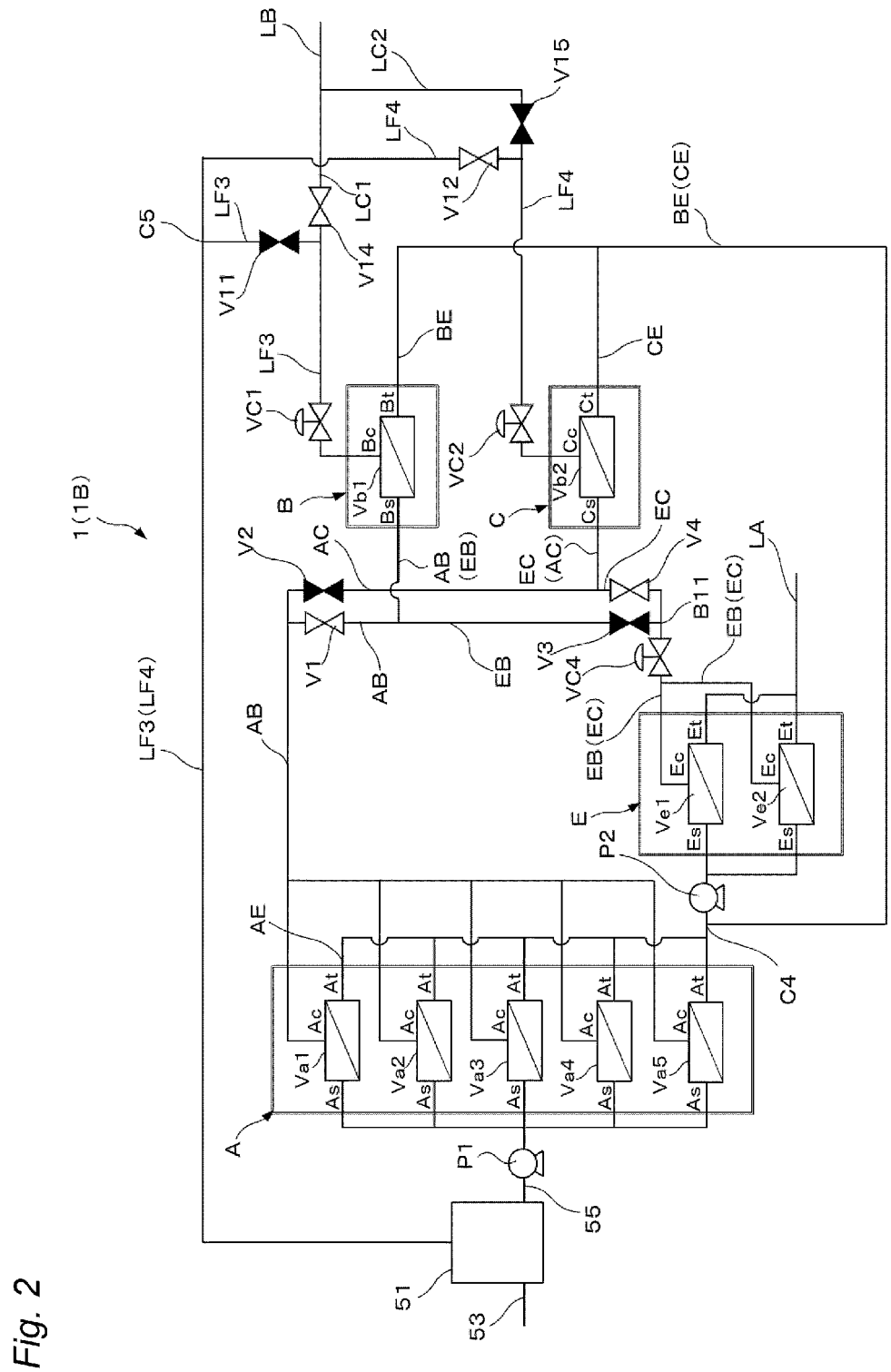
FIG. 2 is a schematic configuration diagram illustrating a preferred embodiment (second embodiment) of a water treatment system according to the present invention.

As illustrated in FIG. 2, the water treatment system 1 (1B) has a configuration similar to that of the water treatment system 1A, except that the line configuration linking the RO membrane device B and the RO membrane device C with the raw water tank 51, and the line configuration linking the RO membrane devices B and C with the supply side of the RO membrane device E are different. That is, the water treatment system 1 (1B) includes the RO membrane device A, the RO membrane device E, and a plurality of RO membrane devices (in the embodiment illustrated in FIG. 2, RO membrane device B and RO membrane device C). Furthermore, it is preferable that this water treatment system 1B has the raw water tank 51, a tank supply line 53 is connected to the raw water tank 51, and a raw water supply line 55 is connected to the supply side As of the RO membrane device A. It is preferable that the first pump P1 is disposed on the raw water supply line 55.

Similarly to the water treatment system 1A of the first embodiment, in the respective lines connected from the RO membrane device A to the RO membrane device E, from the RO membrane device A to the RO membrane devices B and C, and from the RO membrane device E to the RO membrane devices B and C, the line AE, line AB, line AC, line EB, and line EC are disposed. With regard to these lines, some of the lines may be shared, similarly to the water treatment system 1A.

A gate valve V1 is disposed on the line AB, a gate valve V2 is disposed on the line AC, a gate valve V3 is disposed on the line EB, and a gate valve V4 is disposed on the line EC. Furthermore, a control valve VC4 is disposed on the line EB (EC). The control valve VC4 is a valve that adjusts the pressure of the RO membrane device E.

Furthermore, in the water treatment system 1B, the permeated water side Et of the RO membrane device E is connected to the water treatment line LA. Moreover, similarly to the water treatment system 1A, the water treatment system 1B is configured such that a first connection line that passes water through the line AB and passes water through the line AE and line EC, and a second connection line that passes water through the line AC and passes water through the line AE and line EB, can be alternately switched. Switching between the first connection line and the second connection line can be carried out in the same manner as in the above-mentioned water treatment system 1A.

As a result, the water treatment system 1B can perform removal of scale in the RO membrane device B and the RO membrane device C in a timely manner, using the concentrated water from the RO membrane device E that treats the permeated water from the RO membrane device A, without stopping the water treatment.

The concentrated water side Bc of the RO membrane device B of the water treatment system 1B is connected to the raw water tank 51 by a raw water return line LF3 (hereinafter, also referred to as line LF3) in which a control valve VC1, which is a pressure adjusting valve, and a gate valve V11 are disposed in this order from the concentrated water side Bc. The concentrated water side Cc of the RO membrane device C is connected to the raw water tank 51 by a raw water return line LF4 (hereinafter, also referred to as line LF4) in which a control valve VC2, which is a pressure adjusting valve, and a gate valve V12 are disposed in this order from the concentrated water side Cc. The line LF4 may join the raw water return line LF3 as illustrated in the diagram and be connected to the raw water tank 51. Furthermore, the line LF3 and the line LF4 may be singly and each independently connected to the raw water tank 51.

It is preferable that a line LC1 is branched from the line LF3 between the control valve VC1 and the gate valve V11 and is connected to a blow line LB. It is preferable that a line LC2 is branched from the line LF4 between the control valve VC2 and the gate valve V12 and is connected to the blow line LB. It is preferable that a gate valve V14 is disposed on the line LC1, and it is preferable that a gate valve V15 is disposed on the line LC2. The control valves VC1 and VC2 have functions similar to those of the control valves VC1 and VC2 of the above-mentioned water treatment system 1A and are used for a similar purpose.

On the other hand, the permeated water side Bt of the RO membrane device B is connected to the supply side Es of the RO membrane device E through a permeated water flow line BE (hereinafter, also referred to as line BE). Similarly, the permeated water side Ct of the RO membrane device C is connected to the supply side Es of the RO membrane device E through a permeated water flow line CE (hereinafter, also referred to as line CE). The lines BE and CE may be single lines. Alternatively, as illustrated in the diagram, the line CE may join the line BE in the middle and be connected to the supply side Es of the RO membrane device E.

Then, a fifth connection line that passes water through the raw water return line LF4 at the time of using the first connection line, and a sixth connection line that passes water through the raw water return line LF3 at the time of using the second connection line, can be switched in response to the switching between the first connection line and the second connection line.

Moreover, it is preferable that on the line AE, a second pump P2 is disposed between a confluence C4 between the line AE and the line BE and the supply side Es of the RO membrane device E.

The present water treatment system 1B can perform supply of the permeated water from the RO membrane device A and supply of the permeated water from the RO membrane devices B and C by means of one unit of the second pump P2, similarly to the water treatment system 1A of the first embodiment. As a result, there is no need to attach a pump for feeding the permeated water from the RO membrane devices B and C. This makes it possible to prevent an increase in the electric power cost due to consumption of the pump and to suppress an increase in the footprint (occupied area) caused by the pump.

Furthermore, since the liquid feeding pressure of the second pump P2 is applied to the concentrated water sent out from the concentrated water side Bc of the RO membrane device B, to which the concentrated water from the RO membrane device E is supplied, the concentrated water can be sent to the raw water tank 51 through the line LF3. Also for the concentrated water sent out from the concentrated water side Cc of the RO membrane device C, to which the concentrated water from the RO membrane device E is supplied, since the liquid feeding pressure of the second pump P2 is applied to the concentrated water similarly to the RO membrane device B, the concentrated water can be sent to the raw water tank 51 through the line LF4 (LF3).

Therefore, in the water treatment system 1B, the concentrated water obtained by treating the concentrated water from the RO membrane device A by the RO membrane devices B and C is returned to the raw water tank 51 and the supply side Es of the RO membrane device E, subjected to an RO membrane treatment, and finally sent to the water treatment line LA, except that the concentrated water is sent to the blow line LB. As a result of this, the intended high-purity water can be obtained at a high recovery rate.

Next, another preferred embodiment of the water treatment system according to the present invention (third embodiment) will be described with reference to FIG. 3.

Figure 3:
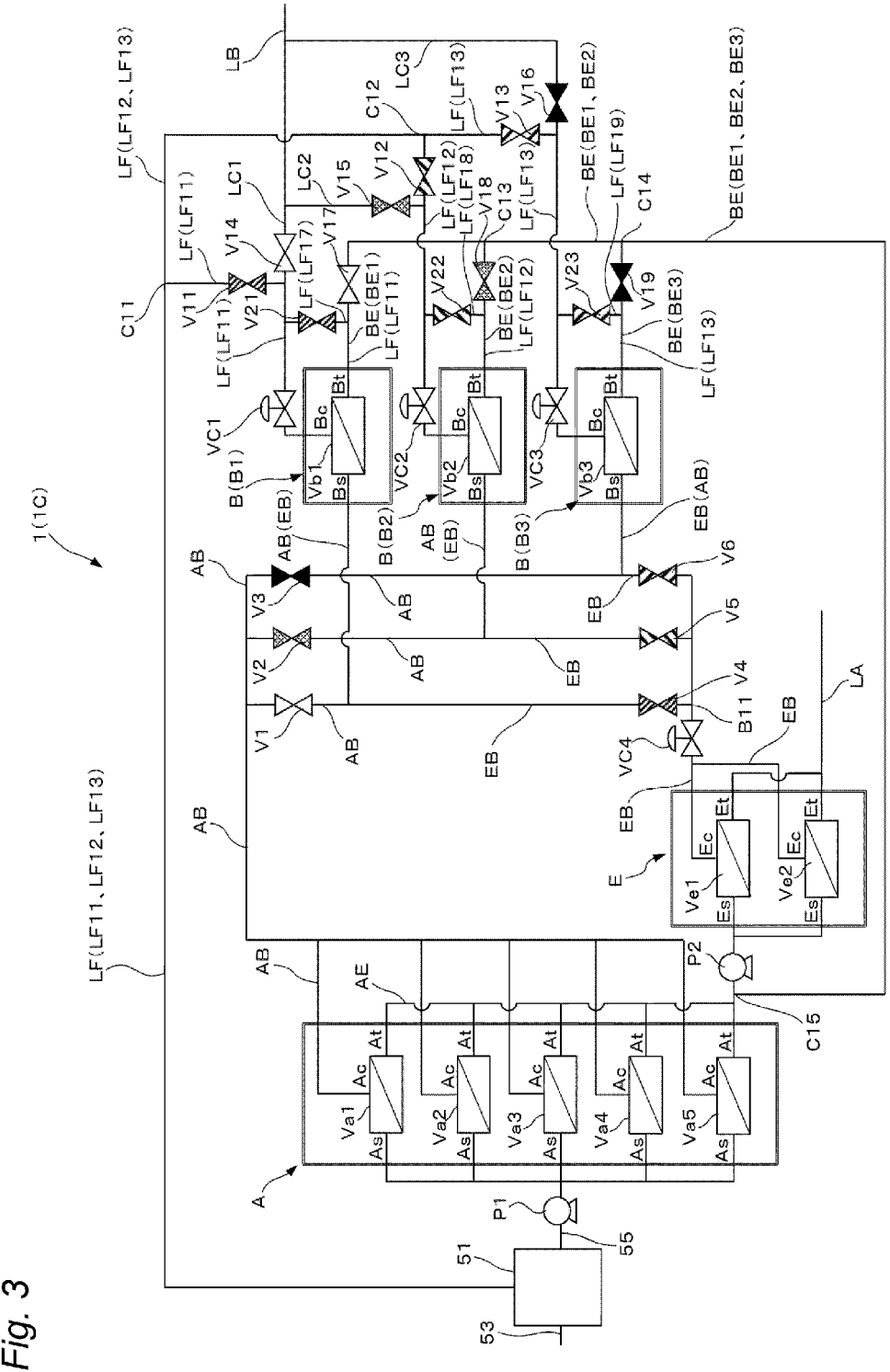
FIG. 3 is a schematic configuration diagram illustrating a preferred embodiment (third embodiment) of a water treatment system according to the present invention.

As illustrated in FIG. 3, a water treatment system 1 (1C) includes a reverse osmosis membrane device A for treating a water to be treated; a reverse osmosis membrane device E for treating permeated water from the reverse osmosis membrane device A; and a plurality of reverse osmosis membrane devices B for treating concentrated water from the reverse osmosis membrane device A and concentrated water from the reverse osmosis membrane device E. In the illustrated example, the respective configurations of the reverse osmosis membrane devices A and E are similar to the respective configurations of the reverse osmosis membrane devices A and E of the above-described first embodiment. The reverse osmosis membrane device B includes, for example, three reverse osmosis membrane devices B1 to B3.

The water treatment system 1C is an embodiment in which a plurality of reverse osmosis membrane devices B (B1 to B3) is installed instead of the reverse osmosis membrane devices B and C of the above-mentioned water treatment system 1A, and is basically similar to the water treatment system 1A, except that the respective lines connected to these reverse osmosis membrane devices B are partially modified. Hereinafter, with regard to the water treatment system 10 as well, the "reverse osmosis membrane device" is also referred to as "RO membrane device".

It is preferable that the water treatment system 10 includes a raw water tank 51 in which raw water as a water to be treated is stored. It is preferable that a tank supply line 53 to which raw water is supplied is connected to the raw water tank 51. Furthermore, it is preferable that the supply side As of the RO membrane device A is connected to the raw water tank 51 through a raw water supply line 55. It is preferable that the first pump P1 is disposed on the raw water supply line 55. Therefore, it is preferable that raw water stored in the raw water tank 51 is supplied to each of the supply sides As of the RO membrane device A by applying pressure by means of the first pump P1.

The water treatment system 10 includes a concentrated water flow line AB (hereinafter, also referred to as line AB) connecting a concentrated water side Ac of the RO membrane device A with a supply side Bs of each of the RO membrane devices B. Furthermore, a permeated water flow line AE (hereinafter, also referred to as line AE) connecting a permeated water side At of the RO membrane device A with a supply side Es of the RO membrane device E is included. Furthermore, a concentrated water flow line EB (hereinafter, also referred to as line EB) connecting a concentrated water side Ec of the RO membrane device E with the supply side Bs of each of the RO membrane devices B is included. That is, the water treatment system 1C has a plurality of concentrated water flow lines AB and a plurality of concentrated water flow lines EB.

It is preferable that on the line EB, a control valve VC4 is disposed between the concentrated water side Ec of the RO membrane device E and a branch point B11 branched to each of the RO membrane devices B. The flow rate of concentrated water from the RO membrane device E is controlled by this control valve VC4.

Specifically, lines AB connecting the concentrated water side Ac of the RO membrane device A with the respective supply sides Bs of a plurality (X units, X is preferably 2 or more and the same number as the number of vessels of the RO membrane device A at the maximum) of the RO membrane devices B (in the embodiment illustrated in FIG. 3, three RO membrane devices B of B1, B2, and B3) are disposed. A line AE connecting the permeated water side At of the RO membrane device A with the supply side Es of the RO membrane device E is disposed. Furthermore, lines EB connecting the concentrated water side Ec of the RO membrane device E with the respective supply sides Bs of the RO membrane devices B are disposed. As in the case of the line configuration illustrated in the diagram, some of the lines AB and some of the lines EB may be shared on the side of the supply side Bs.

One line $EB^X$ is selected from unselected ones of the above-described lines EB. Furthermore, the line AB is connected to the supply sides Bs of the other RO membrane devices B (for example, B1 and B3), except for the RO membrane device $B^X$ (for example, B2) to which the selected one line $EB^X$ is connected. When the lines EB are selected one by one, there are as many lines as the number of RO membrane devices B (that is, X units) that can be the line $EB^X$.

According to an embodiment, among the above-described plurality (X units) of connection lines, for example, connection line I is selected. In the connection line I, the concentrated water from the RO membrane device E passes through one line $EB^X$ selected from the unselected lines EB. Furthermore, the concentrated water from the RO membrane device A passes through the line AB that is connected to the supply side Bs of the other RO membrane devices B (for example, B1 and B3) except for the RO membrane device B to which the line $EB^X$ is connected (for example, $B^X$ (B2)). Next, the connection line I is updated by selecting one line from the unselected lines EB instead of the line $EB^X$ and employing the selected line as a new line $EB^X$, and this is used as a new connection line I. The concentrated water from the RO membrane device E passes through the line $EB^X$ in the updated new connection line I, and the concentrated water from the RO membrane device A passes through the line AB that is connected to each of the supply sides Bs of the other RO membrane devices B (for example, B1 and B2) except for the RO membrane device B to which the line $EB^X$ is connected (for example B3). Similarly, it is possible to sequentially update the connection line I and thereby sequentially switch to a new connection line I.

As such, the concentrated water from the RO membrane device E obtained by treating the permeated water from the RO membrane device A is caused to flow sequentially to the RO membrane devices B that have treated the concentrated water from the RO membrane device A, and thereby the scale generated on the RO membrane of the RO membrane device B can be dissolved in this concentrated water and removed.

The above-described term "sequentially" means that among a plurality (X units) of lines EB, a new different line $EB^X$ is selected every time the connection line is switched. It is preferable that the updating of the selection of this line $EB^X$ is carried out sequentially until there is no more line EB that has not been selected as $EB^X$. Furthermore, even after all of the plurality of lines EB have been selected (after one cycle of the selection of each of the lines EB has been made), removal of the scale generated on the RO membranes and water treatment by the RO membrane devices can be carried out in parallel by sequentially updating the selection of $EB^X$ and performing the water treatment in the same manner.

Meanwhile, regarding the selection of $EB^X$, it is also possible to select a plurality of $EB^X$'s at the same time. In this case as well, it is preferable that a new different line $EB^X$ is selected every time the connection line is switched. It is preferable that the updating of the selection of this line $EB^X$ in this case is carried out sequentially until there is no more line EB that has not been selected as $EB^X$. Furthermore, before and after the updating of the selection of $EB^X$, the number of lines selected as $EB^X$ may be the same or different.

The switching of the connection line I can be carried out by, for example, a valve operation. For example, according to the embodiment illustrated in FIG. 3, it is preferable that on each of the lines AB connecting the concentrated water side Ac of the RO membrane device A with the respective supply sides Bs of the RO membrane devices B (B1, B2, and B3), gate valves V1, V2, and V3 are respectively disposed. Furthermore, it is preferable that on each of the lines EB connecting the concentrated water side Ec of the RO membrane device E with the respective supply sides Bs of the RO membrane devices B (B1, B2, and B3), gate valves V4, V5, and V6 are respectively disposed.

It is possible to switch the connection line I to another connection line I by appropriately opening and closing the gate valves V1 to V6.

As an example, the connection line I can be opened up by opening the gate valves V1, V2, and V6, and at this time, the gate valves V3, V4, and V5 are closed. Furthermore, through switching, an updated new connection line I can be opened up by opening the gate valves V2, V3, and V4, and at this time, the gate valves V1, V5, and V6 are closed. Moreover, when switching of opening the gate valves V1, V3, and V5 is carried out, an updated new connection line I can be opened up, and at this time, the gate valves V2, V4, and V6 are closed.

As described above, the line connected to the concentrated water side Ec of the RO membrane device E is sequentially switched one by one for each of the RO membrane devices B1 to B3. In this manner, the connection line I that passes the concentrated water from the RO membrane device A and the concentrated water from the RO membrane device E is sequentially updated. As a result, all of the RO membrane devices B1 to B3 can be washed sequentially by means of the concentrated water from the RO membrane device E obtained by treating the permeated water from the RO membrane device A.

Moreover, the water treatment system 1C includes a raw water return line LF (hereinafter, also referred to as line LF) connecting each of the concentrated water sides Bc and each of the permeated water sides Bt of the RO membrane devices B (B1 to B3) with the raw water tank 51. It is preferable that on the line LF connected to the concentrated water side Bc, a control valve, which is a pressure adjusting valve, and a gate valve are disposed in this order from the concentrated water side Bc. For example, on the raw water return line LF (LF11 (hereinafter, also referred to as line LF11)) connected to the concentrated water side Bc of the RO membrane device B1, it is preferable that a control valve VC1 and a gate valve V11 are disposed in this order from the concentrated water side Bc. On the raw water return line LF (LF12 (hereinafter, also referred to as line LF12)) connected to the concentrated water side Bc of the RO membrane device B2, it is preferable that a control valve VC2 and a gate valve V12 are disposed in this order from the concentrated water side Bc. On the raw water return line LF (LF13 (hereinafter, also referred to as line LF13)) connected to the concentrated water side Bc of the RO membrane device B3, it is preferable that a control valve VC3, which is a pressure adjusting valve, and a gate valve V13 are disposed in this order from the concentrated water side Bc.

The lines LF11 to 13 may join, for example, the line LF11 and the line LF12 at the confluence C11 and join the line LF12 and the line LF13 at the confluence C12, and each of the lines LF11 to 13 may be singly connected to the raw water tank 51.

Regarding the control valves VC1 to VC3, control valves similar to the control valves of the first embodiment can be used.

It is preferable that a line LC1 is branched from the line LF11 between the control valve VC1 and the gate valve V11 and is connected to a blow line LB. Furthermore, it is preferable that a line LC2 is branched from the line LF12 between the control valve VC2 and the gate valve V12 and is connected to the blow line LB, and that a line LC3 is branched from the line LF13 between the control valve VC3 and the gate valve V13 and is connected to the blow line LB. It is preferable that a gate valve V14 is disposed on the line LC1, a gate valve V15 is disposed on the line LC2, and a gate valve V16 is disposed on the line LC3.

Furthermore, between the control valve VC1 of the line LF11 and the confluence with a line LF17, a check valve (not illustrated in the diagram) that prevents inflow of the permeated water from the RO membrane device B1 may be disposed on the concentrated water side Bc of the RO membrane device B1. Similarly, a check valve (not illustrated in the diagram) may be disposed between the control valve VC2 of the line LF12 and the confluence with a line LF18 and between the control valve VC2 of the line LF13 and the confluence with the line LF19.

On the other hand, each of the permeated water sides Bt of the RO membrane devices B (B1 to B3) is connected to the supply side Es of the RO membrane device E through a permeated water flow line BE (hereinafter, also referred to as line BE). For example, the permeated water side Bt of the RO membrane device B1 is connected to the supply side Es of the RO membrane device E through a permeated water flow line BE (BE1 (hereinafter, also referred to as line BE1)). The permeated water side Bt of the RO membrane device B2 is connected to the supply side Es of the RO membrane device E through a permeated water flow line BE (BE2 (hereinafter, also referred to as line BE2)). The permeated water side Bt of the RO membrane device B3 is connected to the supply side Es of the RO membrane device E through a permeated water flow line BE (BE3 (hereinafter, also referred to as line BE3)). The lines BE1 to BE3 may be single lines. Alternatively, as illustrated in the diagram, the lines BE2 and BE3 may join the line BE1 in the middle and be connected to the supply side Es of the RO membrane device E.

It is preferable that a gate valve 17 is disposed on the line BE1 between the confluence C13 with the line BE2 and the RO membrane device B1. Furthermore, it is preferable that a gate valve 18 is disposed on the line BE2 between the confluence C13 and the RO membrane device B2, and that a gate valve 19 is disposed on the line BE3 between the confluence C14 with the line BE1 and the RO membrane device B3.

It is preferable that the line LF connected to the permeated water side Bt of the RO membrane device B (B1) includes, for example, the line LF11 of the portion connected to the permeated water side Bt of the RO membrane device B1 (may be shared with the line BE1 similarly to the illustrated example), the line LF11 of the portion connected to the raw water tank 51, and the line LF17 connecting the two lines LF11. For example, it is preferable that the line LF17 is branched from the line BE1 between the RO membrane device B1 and the gate valve V17 and is disposed so as to be connected to the line LF11 from the concentrated water side Bc between the control valve VC1 and the gate valve V11. It is preferable that a gate valve V21 is disposed on the line LF17.

Furthermore, it is preferable that the line LF connected to the permeated water side Bt of the RO membrane device B (B2) includes, for example, the line LF12 of the portion connected to the permeated water side Bt of the RO membrane device B2 (may be shared with the line BE2 similarly to the illustrated example), the line LF12 of the portion connected to the raw water tank 51, and the line LF18 connecting the two lines LF12. For example, it is preferable that the line LF18 is branched from the line BE2 between the RO membrane device B2 and the gate valve V18 and is disposed so as to be connected to the line LF12 from the concentrated water side Bc between the control valve VC2 and the gate valve V12. It is preferable that a gate valve V22 is disposed on the line LF18.

Furthermore, it is preferable that the line LF connected to the permeated water side Bt of the RO membrane device B (B3) includes, for example, the line LF13 of the portion connected to the permeated water side Bt of the RO membrane device B3 (may be shared with the line BE3 similarly to the illustrated example), the line LF13 of the portion connected to the raw water tank 51, and the line LF19 connecting the two lines LF13. For example, it is preferable that the line LF19 is branched from the line BE3 between the RO membrane device B3 and the gate valve V19 and is disposed so as to be connected to the line LF13 from the concentrated water side Bc between the control valve VC3 and the gate valve V13. It is preferable that a gate valve V23 is disposed on the line LF19.

It is preferable that a second pump P2 as a liquid feeding pump is disposed on the side of the supply side Es of the line AE connected to the supply side Es of the RO membrane device E. That is, the second pump P2 is disposed on the line AE between the confluence C15 of the line AE and the line BE, the line AE being a result of all the lines AE connected to the permeated water side At of the RO membrane device A having joined, and the supply side Es of the RO membrane device E. Regarding this second pump P2, one similar to the second pump of the first embodiment can be used.

In the water treatment system 1C, with regard to the RO membrane device B where the concentrated water from the RO membrane device A is treated, a connection line II that passes water through the line BE connecting the permeated water side Bt of the RO membrane device B with the supply side Es of the RO membrane device E is selected. Furthermore, with regard to the RO membrane device B where the concentrated water from the RO membrane device E is treated, a connection line III that passes water through the line LF connecting the concentrated water side Bc and the permeated water side Bt of the RO membrane device B with the raw water tank 51 is selected.

For example, in a case where the concentrated water from the RO membrane device A is treated by the RO membrane devices B1 and B2, a connection line II that passes water through the lines BE1 and BE2 connecting the respective permeated water sides Bt of the RO membrane devices B1 and B2 with the supply side Es of the RO membrane device E is selected. At this time, the concentrated water from the RO membrane device E is treated by the RO membrane device B3.

Furthermore, when the connection line II is selected, a connection line III that passes water through the lines LF3, LF19, and LF13 (line LF) connecting the permeated water side Bt and the concentrated water side Bc of the RO membrane device B3 with the raw water tank 51 is selected.

As such, the connection line III is selected for the RO membrane device $B^x$, which is one of a plurality of the RO membrane devices B, to wash the RO membrane device $B^x$, and for the RO membrane devices B other than the RO membrane device $B^x$, the connection line II is selected to treat the concentrated water from the RO membrane device A.

The selection of the connection line II and the connection line III can be carried out by, for example, a valve operation. For example, with regard to the embodiment illustrated in FIG. 3, the disposition of the valves is as described above.

It is possible to switch the connection line II and the connection line III by appropriately opening and closing the gate valves V11 to V19 and V21 to V23.

As an example, in a case where the concentrated water from the RO membrane device A is supplied to the RO membrane devices B1 and B2, and the concentrated water from the RO membrane device E is supplied to the RO membrane device B3, the connection line II is opened up by opening the gate valves V17 and V18. As a result, the permeated water obtained by treating the concentrated water from the RO membrane device A at the RO membrane devices B1 and B2 can be returned to the supply side Es of the RO membrane device E. At this time, the gate valves V19, V21, and V22 are closed.

During the above-described treatment, the connection line III can be opened up by opening the gate valves V13 and V23, and the concentrated water and permeated water from the RO membrane device B3 can be returned to the raw water tank 51. At this time, it is preferable that the liquid feeding pressure of the concentrated water from the RO membrane device B3 is controlled by the control valve VC3, and thus the liquid feeding pressure of the concentrated water is adjusted to be almost equal to the liquid feeding pressure of the permeated water so that the permeated water from the RO membrane device B3 joins the concentrated water from the line LF13 of the concentrated water side Bc and flows to the raw water tank 51 side. The gate valve V19 is closed.

Furthermore, with regard to the RO membrane devices B1 and B2, the gate valves V14 and V15 are opened, the gate valves V11 and V12 are closed, and the respective concentrated water sides Bc of the RO membrane devices B1 and B2 are connected to the blow line LB through the lines LF11 and LF12 and the lines LC1 and LC2. Moreover, with regard to the RO membrane device B3, the gate valve V16 is closed, and water flow between the concentrated water side Bc and the blow line LB is cut off.

In a case where washing of the RO membrane device B3 is completed by the above-described setting of the connection line I, connection line II, and connection line III, the connection line I is updated as described above by a valve operation to open up a new connection line I, and the connection line II and the connection line III are also switched in response to the updating of the connection line I.

Then, in a case where the concentrated water from the RO membrane device A is supplied to the RO membrane devices B2 and B3, and the concentrated water from the RO membrane device E is supplied to the RO membrane device B1, the connection line II is opened up by opening the gate valves V18 and V19. As a result, the permeated water obtained by treating the concentrated water from the RO membrane device A with the RO membrane devices B2 and B3 can be returned to the supply side Es of the RO membrane device E. At this time, the gate valves V17, V22, and V23 are closed. During this treatment, the connection line III can be opened up by opening the gate valves V11 and V21, and the concentrated water and permeated water from the RO membrane device B1 can be returned to the raw water tank 51. At this time, it is preferable that the liquid feeding pressure of the concentrated water from the RO membrane device B1 is controlled by the control valve VC1, and the liquid feeding pressure of the concentrated water is adjusted to be almost equal to the liquid feeding pressure of the permeated water so that the permeated water from the RO membrane device B1 joins the concentrated water from the line LF11 of the concentrated water side Bc and flows to the raw water tank 51 side. The gate valve V17 is closed.

Furthermore, with regard to the RO membrane devices B2 and B3, it is preferable that the gate valves V15 and V16 are opened, the gate valves V12 and V13 are closed, and the concentrated water side Bc is connected to the blow line LB through the lines LF11 and LC1. With regard to the RO membrane device B1, it is preferable that the gate valve V14 is closed, and the water flow between the concentrated water side Bc and the blow line LB is cut off.

In a case where washing of the RO membrane device B1 is completed by this setting of the connection line II and the connection line III, the connection line I is further updated by a valve operation to open up a new connection line I, and the connection line II and the connection line III are also switched.

Moreover, in a case where the concentrated water from the RO membrane device A is supplied to the RO membrane devices B1 and B3, and the concentrated water from the RO membrane device E is supplied to the RO membrane device B2, the connection line II is opened up by opening the gate valves V17 and V19. As a result, the permeated water obtained by treating the concentrated water from the RO membrane device A with the RO membrane devices B1 and B3 can be returned to the supply side Es of the RO membrane device E. At this time, it is preferable that the gate valves V18, V21, and V23 are closed. During this treatment, the connection line III can be opened up by opening the gate valves V12 and V22, and the concentrated water and permeated water from the RO membrane device B2 can be returned to the raw water tank 51. At this time, it is preferable that the liquid feeding pressure of the concentrated water from the RO membrane device B2 is controlled by the control valve VC2, and the liquid feeding pressure of the concentrated water is adjusted to be almost equal to the liquid feeding pressure of the permeated water so that the permeated water from the RO membrane device B2 joins the concentrated water from the line LF12 of the concentrated water side Bc and flows to the raw water tank 51 side. It is preferable that the gate valve V18 is closed.

Furthermore, with regard to the RO membrane devices B1 and B3, it is preferable that the gate valves V14 and V16 are opened, the gate valves V11 and V13 are closed, and the respective concentrated water sides Bc are connected to the blow line LB through the lines LF11, LC1, LF13, and LC3. With regard to the RO membrane device B2, it is preferable that the gate valve V15 is closed, and the water flow between the concentrated water side Bc of the RO membrane device B2 and the blow line LB is cut off.

In a case where washing of the RO membrane device B2 is completed by the above-described setting of the connection line I, the connection line II, and the connection line III, the connection line I is further updated by a valve operation to open up a new connection line I, and the connection line II and the connection line III are also switched. In the case of the present example, since there are three RO membrane devices B, the system returns to the initial state. Then, the treatment of the concentrated water from the RO membrane device A and the washing of the RO membrane device B by the concentrated water from the RO membrane device E can be continuously carried out by performing the treatment in the same manner as described above. That is, continuous operation of the water treatment system is enabled by performing washing of the RO membrane devices B in sequence without stopping the treatment of the concentrated water from the RO membrane device A.

Furthermore, it is preferable that the RO membrane device E treats the permeated water from the RO membrane device A, and this permeated water is supplied to the treated water line LA. On the other hand, it is preferable that the concentrated water obtained by treating is supplied to the RO membrane devices B, and at least the permeated water from the RO membrane devices B is returned and treated again.

In the water treatment system 1C, the permeated water from the RO membrane device A can be pressure-fed to the supply side Es of the RO membrane device E by means of the second pump P2. Moreover, as the second pump P2 is disposed on the supply side Es of the RO membrane device E, the permeated water from the RO membrane devices B can be supplied, in a state of being pressurized, to the supply side Es of the RO membrane device E by means of the second pump P2. As such, since the supply of the permeated water from the RO membrane device A and the supply of the permeated water from the RO membrane devices B can be carried out by one unit of the second pump P2, it is not necessary to attach a pump for feeding the permeated water from the RO membrane devices B. This makes it possible to prevent an increase in the electric power cost due to consumption of the pump and to suppress an increase in the footprint (occupied area) caused by the pump.

Furthermore, since the permeated water from the RO membrane device A and the permeated water from the RO membrane devices B can be fed to the RO membrane device E by applying pressure by the second pump P2, the concentrated water from the RO membrane device E is pressure-fed and is fed to the RO membrane devices B. As a result, it is possible to return the concentrated water and permeated water from the RO membrane devices B to the raw water tank 51 when the concentrated water from the RO membrane device E is pressure-fed, without using the liquid feeding pump.

Still another preferred embodiment of the water treatment system according to the present invention (fourth embodiment) will be described with reference to FIG. 4.

Figure 4:
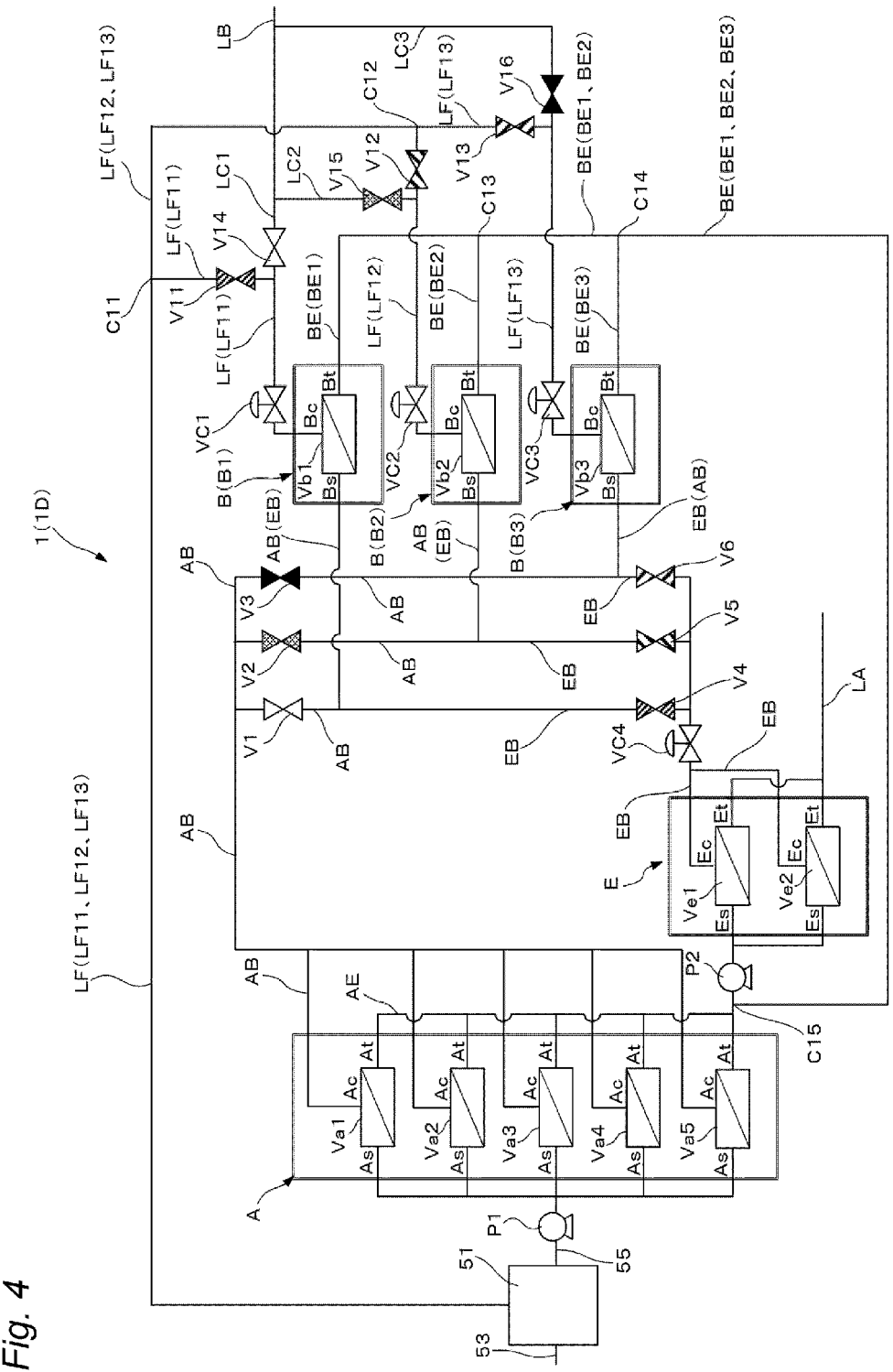
FIG. 4 is a schematic configuration diagram illustrating a preferred embodiment (fourth embodiment) of a water treatment system according to the present invention.

As illustrated in FIG. 4, the water treatment system 1 (1D) has a configuration similar to that of the water treatment system 1C, except that the line configuration linking the RO membrane devices B1 to B3 with the raw water tank 51 and the line configuration linking the RO membrane devices B1 to B3 with the supply side Es of the RO membrane device E are different. That is, the water treatment system 1 (1D) includes the RO membrane device A, the RO membrane device E, and a plurality of RO membrane devices (in the embodiment illustrated in FIG. 4, RO membrane devices B1, B2, and B3). Furthermore, it is preferable that this water treatment system 1D has the raw water tank 51, a tank supply line 53 is connected to the raw water tank 51, and a raw water supply line 55 connected to the supply side As of the RO membrane device A is connected to the system. It is preferable that the first pump P1 is disposed on the raw water supply line 55. Therefore, it is preferable that raw water stored in the raw water tank 51 is supplied to each of the supply sides As of the RO membrane device A by applying pressure by means of the first pump P1.

In the respective lines connected from the RO membrane device A to the RO membrane device E, from the RO membrane device A to the RO membrane devices B1 to B3, and from the RO membrane device E to the RO membrane devices B1 to B3, the line AE, line AB, and line EB are disposed. With regard to these lines, some of the lines may be shared, similarly to the water treatment system 1A of the first embodiment.

The water treatment system 1D includes a concentrated water flow line AB (hereinafter, also referred to as line AB) connecting a concentrated water side Ac of the RO membrane device A with the supply side Bs of each of the RO membrane devices B. Furthermore, a permeated water flow line AE (hereinafter, also referred to as line AE) connecting a permeated water side At of the RO membrane device A with a supply side Es of the RO membrane device E is included. Moreover, a concentrated water flow line EB (hereinafter, also referred to as line EB) connecting the concentrated water side Ec of the RO membrane device E with each of the supply sides Bs of each of the RO membrane devices B (for example, B1 to B3) is included. That is, the water treatment system 1D has a plurality of concentrated water flow lines AB and a plurality of concentrated water flow lines EB.

Specifically, lines AB connecting the concentrated water side Ac of the RO membrane device A with the respective supply sides Bs of the RO membrane devices B are disposed. Furthermore, lines EB connecting the concentrated water side Ec of the RO membrane device E with the respective supply sides Bs of a plurality (X units, X is preferably 2 or more and the same number as the number of vessels A of the RO membrane device A at the maximum) of the RO membrane devices B (in the embodiment illustrated in FIG. 4, three RO membrane devices B of B1, B2, and B3), are disposed. As in the case of the line configuration illustrated in the diagram, some of the lines AB and some of the lines EB may be shared on the side of the supply side Bs.

One line EB$^X$ is selected from unselected ones of the above-described lines EB. Furthermore, the line AB is connected to the supply sides Bs of the other RO membrane devices B (for example, B1 and B2), except for the RO membrane device B$^X$ (for example, B3) to which the selected one line EB$^X$ is connected. When the EB lines are selected one by one, there are as many lines as the number of RO membrane devices B (that is, X units) that can be EB$^X$.

The method of selecting the connection line I among the plurality (X units) of connection lines is similar to that for the above-described water treatment system 10 of the third embodiment. The connection line I is selected, the concentrated water from the RO membrane device E is passed through one line $EB^X$ selected from unselected lines EB, and the concentrated water from the RO membrane device A is passed to the supply sides Bs of the RO membrane devices B (for example, B1 and B3), except for the RO membrane device $B^X$ (for example, B2) to which the line $EB^X$ is connected. Next, one line is selected from the unselected lines EB instead of the line $EB^X$, and the connection line I is updated as a new line $EB^X$. The concentrated water from the RO membrane device A is passed through the line $EB^X$ in the updated new connection line I, and the concentrated water from the RO membrane device A is passed through the line AB that is connected to each of the supply sides Bs of the RO membrane devices B (for example, B1 and B2), except for the RO membrane device B (for example, B3) to which the line $EB^X$ is connected. Similarly, the connection line I is sequentially updated and is thereby switched sequentially to a new connection line I.

As such, the concentrated water from the RO membrane device E obtained by treating the permeated water from the RO membrane device A is caused to flow sequentially to the RO membrane devices B that have treated the concentrated water from the RO membrane device A, and thereby the scale generated on the RO membrane of the RO membrane device B can be dissolved in this concentrated water and removed.

The above-described term "sequentially" is as mentioned above and means that among a plurality (X units) of lines EB, a new different line $EB^X$ is selected every time the connection line is switched.

The switching of the connection line I can be carried out by, for example, a valve operation. For example, in the embodiment of FIG. 4, it is preferable that gate valves V1 to V6 are disposed similarly to the above-mentioned embodiment of FIG. 3, and the valve operation is carried out similarly to the above-mentioned embodiment illustrated in FIG. 3.

It is possible to switch the connection line I to another connection line I by appropriately opening and closing the gate valves V1 to V6.

Moreover, the water treatment system 1D includes a raw water return line LF (hereinafter, also referred to as line LF) connecting each of the concentrated water sides Bc of the RO membrane devices B (B1 to B3) with the raw water tank 51.

It is preferable that on the line LF connected to the concentrated water side Bc, a control valve, which is a pressure adjusting valve, a check valve, and a gate valve are disposed in this order from the concentrated water side Bc. For example, on the raw water return line LF (LF11 (hereinafter, also referred to as LF11)) connected to the concentrated water side Bc of the RO membrane device B1, it is preferable that a control valve VC1 and a gate valve V11 are disposed in this order from the concentrated water side Bc. On the raw water return line LF (LF12 (hereinafter, also referred to as LF12)) connected to the concentrated water side Bc of the RO membrane device B2, it is preferable that a control valve VC2 and a gate valve V12 are disposed in this order from the concentrated water side Bc. On the raw water return line LF (LF13 (hereinafter, also referred to as line LF13)) connected to the concentrated water side Bc of the RO membrane device B3, it is preferable that a control valve VC3 and a gate valve V13 are disposed in this order from the concentrated water side Bc.

Regarding the control valves VC1 to VC3, pressure adjusting valves similar to the control valves of the first embodiment can be used.

Furthermore, a check valve (not illustrated in the diagram) may be disposed between the control valve VC1 and the gate valve V11 of the line LF11. Similarly, check valves (not illustrated in the diagram) may be disposed between the control valve VC2 and the gate valve V12 of the line LF12 and between the control valve VC2 and the gate valve V13 of the line LF13.

The above-described control valves VC1 to VC3 have functions similar to those of the control valves VC1 to VC3 of the above-mentioned water treatment system 10 and are used for a similar purpose.

The lines LF11 to 13 may join, for example, the line LF11 and the line LF12 at the confluence C11 and join the line LF12 and the line LF13 at the confluence C12, and each of the lines LF11 to 13 may be singly connected to the raw water tank 51.

It is preferable that a line LC1 is branched from the line LF11 between the control valve VC1 and the gate valve V11 and is connected to a blow line LB. Furthermore, it is preferable that a line LC2 is branched from the line LF12 between the control valve VC2 and the gate valve V12 and is connected to the blow line LB, and that a line LC3 is branched from the line LF13 between the control valve VC3 and the gate valve V13 and is connected to the blow line LB. It is preferable that a gate valve V14 is disposed on the line LC1, a gate valve V15 is disposed on the line LC2, and a gate valve V16 is disposed on the line LC3.

On the other hand, each of the permeated water sides Bt of the RO membrane devices B (B1 to B3) is connected to the supply side Es of the RO membrane device E through a permeated water flow line BE (hereinafter, also referred to as line BE). For example, the permeated water side Bt of the RO membrane device B1 is connected to the supply side Es of the RO membrane device E through a permeated water flow line BE (BE1 (hereinafter, also referred to as line BE1)). The permeated water side Bt of the RO membrane device B2 is connected to the supply side Es of the RO membrane device E through a permeated water flow line BE (BE2 (hereinafter, also referred to as line BE2)). The permeated water side Bt of the RO membrane device B3 is connected to the supply side Es of the RO membrane device E through a permeated water flow line BE (BE3 (hereinafter, also referred to as line BE3)). The lines BE1 to BE3 may be single lines. Alternatively, as illustrated in the diagram, the lines BE2 and BE3 may join the line BE1 in the middle and be connected to the supply side Es of the RO membrane device E.

Furthermore, it is preferable that a second pump P2 as a liquid feeding pump is disposed on the side of the supply side Es of the RO membrane device E of the line AE connected to the supply side Es of the RO membrane device E. That is, the second pump P2 is disposed on the line AE between the confluence C15 of the line AE and the line BE, the line AE being a result of all the lines AE connected to the permeated water side At of the RO membrane device A having joined, and the supply side Es of the RO membrane device E. Regarding this second pump P2, one similar to the second pump of the first embodiment can be used.

In the water treatment system 1D, with regard to the RO membrane device B where the concentrated water from the RO membrane device A is treated, the line BE connecting the permeated water side Bt of the RO membrane device B with the supply side Es of the RO membrane device E is always in a state of water flowing. Furthermore, with regard to the RO membrane device B where the concentrated water from the RO membrane device E is treated, the connection line III that passes water through the line LF linking the concentrated water side Bc of the RO membrane device B with the raw water tank 51, is selected.

For example, in a case where the concentrated water from the RO membrane device A is treated by the RO membrane devices B1 and B2, the respective permeated water sides Bt of the RO membrane devices B1 and B2 and the supply side Es of the RO membrane device E are in a state of water flowing at all times. At this time, the concentrated water from the RO membrane device E is treated by the RO membrane device B3. Furthermore, the connection line III that passes water through the line LF13 and the line LF, which link the concentrated water side Bc of the RO membrane device B3 with the raw water tank 51, is selected.

As such, the connection line III is selected for one RO membrane device $B^X$ among a plurality of the RO membrane devices B, and thereby the RO membrane device $B^X$ is washed.

The selection of the connection line III can be carried out by, for example, a valve operation. For example, with regard to the embodiment illustrated in FIG. 4, the disposition of the valves is as described above.

It is possible to select the connection line III by appropriately opening and closing the gate valves V11 to V16.

As an example, when the concentrated water from the RO membrane device A is supplied to the RO membrane devices B1 and B2, and the concentrated water from the RO membrane device E is supplied to the RO membrane device B3, the permeated water obtained by treating the concentrated water from the RO membrane device A with the RO membrane devices B1 and B2 can be returned to the supply side Es of the RO membrane device E. During the above-described treatment, the connection line III can be opened up by opening the gate valve V13, and the concentrated water from the RO membrane device B3 can be returned to the raw water tank 51. Furthermore, with regard to the RO membrane devices B1 and B2, the gate valves V14 and V15 disposed on the lines LC1 and LC2 that are connected to the concentrated water side Bc through the lines LF11 and LF12 are opened, and the gate valves V11 and V12 are closed so that the RO membrane devices B1 and B2 are connected to the blow line LB. Furthermore, with regard to the RO membrane device B3, the gate valve V16 disposed on the line LC3 that is connected to the blow line LB on the concentrated water side Bc through the line LF13 is closed.

In a case where washing of the RO membrane device B3 is completed by the above-described setting of the connection line III, the connection line I is updated as described above by a valve operation to open up a new connection line I, and the connection line III is also switched.

Then, since the lines BE1 to BE3 are opened up at all times, in a case where the concentrated water from the RO membrane device A is supplied to the RO membrane devices B2 and B3, the permeated water from the RO membrane devices B2 and B3 is returned to the supply side Es of the RO membrane device E. At this time, the concentrated water from the RO membrane device E is supplied to the RO membrane device B1. During this treatment, the connection line III can be opened up by opening the gate valve V11, and the concentrated water from the RO membrane device B1 can be returned to the raw water tank 51. Furthermore, with regard to the RO membrane devices B2 and B3, the gate valves V15 and V16 disposed on the lines LC2 and LC3 that are connected to the concentrated water side Bc through the lines LF12 and LF13 are opened, and the gate valves V12 and V13 are closed so that the RO membrane devices B2 and B3 are connected to the blow line LB. Furthermore, with regard to the RO membrane device B1, the gate valve V14 disposed on the line LC3 that is connected to the blow line LB on the concentrated water side Bc through the line LF11 is closed.

In a case where washing of the RO membrane device B1 is completed by this setting of the connection line III, the connection line I is further updated by a valve operation to open up a new connection line I, and the connection line III is also switched.

Furthermore, since the lines BE1 to BE3 are opened up at all times, in a case where the concentrated water from the RO membrane device A is supplied to the RO membrane devices B1 and B3, the permeated water from the RO membrane devices B1 and B3 is returned to the supply side Es of the RO membrane device E. At this time, when the concentrated water from the RO membrane device E is supplied to the RO membrane device B2, the connection line III can be opened up by opening the gate valve V12, and the concentrated water from the RO membrane device B2 can be returned to the raw water tank 51. Furthermore, with regard to the RO membrane devices B1 and B3, the gate valves V14 and V16 disposed on the lines LC1 and LC3 that are connected to the concentrated water side Bc through the lines LF11 and LF13 are opened, and the gate valves V11 and V13 are closed so that the RO membrane devices B1 and B3 are connected to the blow line LB. Furthermore, with regard to the RO membrane device B2, the gate valve V15 disposed on the line LC2 that is connected to the blow line LB on the concentrated water side Bc through the line LF12 is closed.

In a case where washing of the RO membrane device B2 is completed by this setting of the connection line III, the connection line I is further updated by a valve operation to open up a new connection line I, and the connection line III is also switched. In the case of the present example, since there are three RO membrane devices B, the system returns to the initial state. Then, the treatment of the concentrated water from the RO membrane device A and the washing of the RO membrane device B by the concentrated water from the RO membrane device E can be continuously carried out by performing the treatment in the same manner as described above. That is, continuous operation of the water treatment system is enabled by performing washing of the RO membrane devices B in sequence without stopping the treatment of the concentrated water from the RO membrane device A.

Incidentally, the embodiments of the water treatment systems 1C and 1D described above are only examples, and those ordinarily skilled in the art can carry out embodiments obtained by appropriately modifying the above-described examples to the extent that does not impair the effects of the present invention, in terms of the number of lines $EB^X$ through which concentrated water flows (the number of RO membrane devices B), the total number of RO membrane devices B, and the like. For example, an embodiment of selecting a plurality of the lines $EB^X$ through which concentrated water flows, and an embodiment of increasing the number of RO membrane devices B to four or more are also included in the present invention to the extent that the requirements of the present invention are satisfied.

In the above-described water treatment systems 1A and 1B, while an RO membrane device B is washed using the concentrated water from an RO membrane device E, another RO membrane device C is treating the concentrated water from an RO membrane device A. Alternatively, while an RO membrane device C is washed using the concentrated water from an RO membrane device E, another RO membrane device B is treating the concentrated water from an RO membrane device A.

Furthermore, in the above-described water treatment systems 1C and 1D, for example, while an RO membrane device $B^X$, which is one of a plurality of RO membrane devices B, is washed using the concentrated water from an RO membrane device E, RO membrane devices B other than the RO membrane device $B^X$, which is being washed, is treating the concentrated water from an RO membrane device A.

Therefore, washing of an RO membrane device B or C using the concentrated water from an RO membrane device E can be carried out (systems 1A and 1B), or washing of an RO membrane device $B^X$ selected from a plurality of RO membrane devices B can be carried out (systems 1C and 1D), while continuously treating the concentrated water from an RO membrane device A without stopping the treatment of the concentrated water.

The water treatment system 1 has a configuration using two-way type gate valves. Alternatively, for example, a configuration using three-way valves may also be employed. In this case, the number of valves can be reduced, and the valve operation is simplified. Although not illustrated in the diagram, for example, in the embodiment illustrated in FIG. 1, three-way valves are disposed instead of the gate valves V1 and V2, and three-way valves can be disposed instead of the gate valves V3 and V4. Furthermore, three-way valves can be disposed instead of the gate valves V5 and V6, and three-way valves can be disposed instead of the gate valves V12 and V15. Moreover, three-way valves can be disposed instead of the gate valves V21 and V17, and three-way valves can be disposed instead of the gate valves V22 and V18. As such, in a case where gate valves are disposed on the respective branch lines branched from a line, a three-way valve can be disposed at the branch point of the line. The site where the three-way valve is disposed may be a single site or may be a plurality of sites.

With regard to the water treatment system 1, it is preferable that opening and closing of each of the gate valves, control valves, and the like is controlled by a control unit that is not illustrated in the diagram. Therefore, it is preferable that each of the gate valves is an automatic valve that can be opened and closed by the control unit. Among automatic valves, it is preferable that the gate valve is an electronic valve from the viewpoint of the operation speed. It is preferable that the timing for opening and closing of each of the gate valves is set by a timer. At the time when the timing for opening and closing set by the timer is reached, the control unit instructs each of the gate valves to perform an opening or closing action, and thereby each of the gate valves can be opened or closed. Furthermore, also for each of the control valves, it is preferable that the open or closed state is controlled by the control unit.

When the water to be treated is supplied to the RO membrane device A, in a case where there is a rapid variation in the pressure, there is a possibility that the RO membrane may be broken. Therefore, it is necessary to perform the opening and closing of a gate valve slowly. Furthermore, in order to avoid damage of an RO membrane caused by a rapid variation in pressure, it is preferable that, for example, the first pump P1 is operated through a pump inverter (not illustrated in the diagram) that functions as a flow rate control device. For example, before the gate valve operation, the pressure applied to the RO membrane and the flow rate are decreased by temporarily lowering the inverter value of the first pump P1, subsequently the inverter value is restored by operating the gate valve, and thereby a rapid variation in pressure can be prevented. Furthermore, it is preferable that the second pump P2 is controlled by means of the pump inverter, similarly to the first pump P1.

With regard to the water treatment system 1A, it is preferable that during washing, a measuring unit (not illustrated in the diagram) is provided on any one or more of the line EB through which supplied water (concentrated water from the RO membrane device E) flows to the RO membrane device B, the line LF1 through which the concentrated water from the RO membrane device B flows, and the line BE through which the permeated water flows. Similarly, it is preferable that a measuring unit (not illustrated in the diagram) is provided on any one or more of the line EC through which supplied water (concentrated water from the RO membrane device E) flows to the RO membrane device C, the line LF2 through which the concentrated water from the RO membrane device C flows, and the line CE through which the permeated water flows. Also for the water treatment system 1B, similar matters as described above may be mentioned. That is, it is preferable that during washing, a measuring unit (not illustrated in the diagram) is provided on any one or more of the line EB through which supplied water (concentrated water from the RO membrane device E) flows to the RO membrane device B, the line LF3 through which the concentrated water from the RO membrane device B flows, and the line BE through which the permeated water flows. Similarly, it is preferable that a measuring unit (not illustrated in the diagram) is provided on any one or more of the line EC through which supplied water (concentrated water from the RO membrane device E) flows to the RO membrane device C, the line LF4 through which the concentrated water from the RO membrane device C flows, and the line CE through which the permeated water flows.

With regard to the water treatment systems 1C and 1D, it is preferable that a measuring unit (not illustrated in the diagram) is provided on any one or more of the line EB through which supplied water (concentrated water from the RO membrane device E) flows to each of the RO membrane devices B, the line LF through which the concentrated water from the RO membrane devices B flows, and the line BE through which the permeated water flows.

Specifically, in the water treatment system 1A, regarding the respective measuring units, it is preferable that a measuring unit for any of the electrical conductivity, the ion concentration, and the pH is disposed on the lines EB and EC and the lines LF1 and LF2, and it is preferable that a measuring unit for measuring the amount of permeated water is disposed on the lines BE and CE.

For example, a measuring unit for measuring the ion concentration (for example, calcium (Ca) ion concentration) or the electrical conductivity is disposed on the lines EB and EC, and then a measuring unit for measuring the ion concentration (for example, Ca ion concentration) or the electrical conductivity can be disposed on the lines LF1 and LF2. In this case, when [concentration of supplied water]× [concentration factor (estimated from the recovery rate)]= [concentration of concentrated water] is satisfied, it can be considered that washing is completed.

The "concentration of supplied water" is the Ca ion concentration of the supplied water that is supplied to the RO membrane device B, and the "concentration of concentrated water" is the Ca ion concentration of the concentrated water from the RO membrane device B. When the electrical conductivity is measured, the Ca ion concentration can be estimated from the measured electrical conductivity.

Alternatively, a measuring unit that measures the Ca ion concentration as the ion concentration or the electrical conductivity can be disposed on the lines LF1 and LF2 for the water treatment system 1A and on the lines LF3 and LF4 for the water treatment system 1B. In this case, when the concentration of the concentrated water is gradually decreased, and the variation width becomes preferably 25% or less, more preferably 15% or less, and even more preferably 10% or less, it can be considered that washing is completed. Even in this case, the Ca ion concentration can be estimated from the measured electrical conductivity.

For the measurement of the above-described Ca ions, for example, a portable water quality meter LAQUA (trade name) manufactured by HORIBA Advanced Techno, Co., Ltd. or a TESTMART ECO (trade name) manufactured by Enviro Vision Co., Ltd. can be used. Furthermore, for the measurement of the electrical conductivity, for example, a HE-200C (trade name) manufactured by HORIBA Advanced Techno, Co., Ltd., or a conductivity meter FLXA402 (trade name) manufactured by Yokogawa Electric Corp. can be used.

With regard to the water treatment systems 1A and 1B, it is also preferable to dispose a measuring unit (not illustrated in the diagram) that measures pressure, on the lines EB and EC, lines LF1 and LF2, and lines BE and CE. In a case where the operation of adjusting the amount of permeated water to a constant level is performed by an inverter or the like, the primary side pressure (average value of supply pressure or concentration pressure) of an RO membrane and the transmembrane pressure difference (difference between primary side pressure and permeation pressure) are increased concomitantly with clogging of the membrane. After washing is initiated, when the primary side pressure or the transmembrane pressure difference reaches preferably 120% or less, more preferably 110% or less, or even more preferably 105% or less, with respect to the pressure at the time of using a new RO membrane product, it can be considered that washing is completed.

With regard to the water treatment systems 1A and 1B, it is also preferable that a measuring unit (not illustrated in the diagram) that measures the amount of permeated water is disposed on the lines BE and CE. In this case, after washing is initiated, when the amount of permeated water reaches preferably 80%, more preferably 90%, and even more preferably 95%, with respect to the amount of permeated water at the time of using a new RO membrane, it can be considered that washing is completed.

For the measurement of the amount of permeated water, a flow meter that is used for general fluids, such as an area type, an ultrasonic type, a Coriolis type, or a vortex type flow meter, can be used.

With regard to the water treatment systems 1A and 1B, a measuring unit (not illustrated in the diagram) that measures pH can be disposed on the line EB and the line EC for introducing supplied water (concentrated water from the RO membrane device E) to the supply sides of the RO membrane device B and the RO membrane device C. Furthermore, a measuring unit (not illustrated in the diagram) that measures pH can be disposed on the line LF1 through which the concentrated water from the RO membrane device B flows and the line LF2 through which the concentrated water from the RO membrane device C flows. For example, in a case where calcium carbonate is included in the scale of the RO membranes, after washing is initiated, when the pH of the concentrated water is preferably +2.0 or less, more preferably +1.5 or less, and even more preferably +1.0 or less, with respect to the pH of the supplied water, it can be considered that washing is completed.

Alternatively, a measuring unit that measures pH can be disposed on the line LF1. In this case, after washing is initiated, when the pH of the concentrated water from the RO membrane device B gradually changes, and the variation width becomes preferably 10% or less, more preferably 8% or less, and even more preferably 5% or less, it can be considered that washing is completed. The RO membrane device C is also similar to the RO membrane device B.

For the measurement of the pH, a pH meter is used. As the pH meter, for example, HP-200 (trade name) manufactured by HORIBA Advanced Techno, Co., Ltd. or FLXA402 (trade name) manufactured by Yokogawa Electric Corp. can be used.

With regard to the water treatment systems 1A and 1B, the event that the flow rate display of the amount of the permeated water from the RO membrane device B that is passing the concentrated water from the RO membrane device A is less than the amount of permeated water arbitrarily set in advance (alternatively, the primary side pressure or the transmembrane pressure difference of the RO membrane device B is higher than the pressure set in advance), and/or the event that the concentrated water from the RO membrane device E is caused to flow so as to complete washing of the RO membrane device C that is being washed, can be regarded as a trigger for switching of the connection line. The first connection line and the second connection line are switched by this trigger, and thereby water flow and washing can be switched.

Furthermore, with regard to the water treatment systems 1C and 1D, for example, the event that washing of the RO membrane device B (for example, B3) that is being washed is completed, can be regarded as a trigger for switching from the concentrated water flow line EB to the concentrated water flow line EC. The object to which the concentrated water from the concentrated water flow line EB is supplied can be switched to the next RO membrane device by this trigger, and thereby water flow and washing can be switched.

Each of the above-described values measured by each of the above-described measuring units at predetermined time intervals is inputted into the computation unit (not illustrated in the diagram). The change over time and/or difference of at least one of the ion concentration, electrical conductivity, pH, pressure, the amount of permeated water, and the like can be calculated by the values inputted into the computation unit. As the difference, for example, a difference between the measured values measured on the supply side and the concentrated water side of the RO membrane device B for the ion concentration, electrical conductivity, pH, or the like may be mentioned. When the difference reaches a certain value or less, it can be considered that washing is completed. In the case of pressure, when the difference between the primary side pressure or the transmembrane pressure difference of the RO membrane device B and the primary side pressure or the transmembrane pressure difference set in advance reaches a certain value or less, it can be considered that washing is completed. Furthermore, in the case of the amount of permeated water, when the difference between the amount of permeated water on the permeated water side of the RO membrane device B and the amount of permeated water set in advance reaches a certain value or less, it can be considered that washing is completed. It is preferable that the above-described operation is carried out in the same manner as in the case of washing of the RO membrane device C.

It is preferable that a state in which washing has been completed is detected based on the numerical values calculated by the computation unit, and at the timing when washing is completed, in the water treatment systems 1A and 1B, a valve operation of switching between the first connection line and the second connection line is instructed by the control unit. In the water treatment systems 1C and 1D, it is preferable that the object to which the concentrated water from the concentrated water flow line EB is supplied is set to the next RO membrane device B, and that a valve operation of switching for the supply of the concentrated water from the RO membrane device E is instructed.

In the description given above, the Ca ion concentration was measured for the measurement of the ion concentration. Alternatively, the silica concentration may also be measured by changing it to the ion concentration. In this case, as the silica concentration measuring machine, for example, a silica meter 7028 type (trade name) manufactured by Nikkiso Co., Ltd. or a silica analyzer Polymetro 9610SC (trade name) manufactured by HACH Company can be used.

Furthermore, the solubility of Ca can be increased by adding an acidic chemical liquid as a pH adjusting agent to the permeated water. In order to increase the solubility of silica, it is also preferable to add an alkaline chemical liquid. It is a preferred embodiment of the present invention that a pH adjusting agent is added to the permeated water from the RO membrane device A according to the Ca concentration or the silica concentration.

With regard to the RO membrane device that is being washed, it is preferable to measure any one or more of the electrical conductivity, ion concentration, pH, pressure, and the amount of permeated water for any one or more of the supplied water, concentrated water, and permeated water. The change over time and/or difference of those measured values are calculated by the computation unit. The amount of addition of the pH adjusting agent can be determined based on the calculated numerical values. For example, the respective pH values of the supplied water to the RO membrane device B that is being washed (concentrated water from the RO membrane device E) and the concentrated water from the RO membrane device B are measured, and the change over time of the difference of the measured values is calculated. The rate of change over time is calculated from the change over time of the calculated difference, and the expected time of completion of washing is calculated. From the difference between this expected time of completion of washing and a predetermined target time of completion of washing set in advance, if the expected time of completion of washing exceeds the target time of completion of washing, the amount of addition of the pH adjusting agent is increased. As a result of such control, washing can be completed within the target time of completion of washing determined in advance, and the water treatment system 1 can be operated stably. It is preferable that the above-described operation is performed similarly even at the time of washing the RO membrane device C of the water treatment system 1A.

<Adjustment of pH>

A pH adjusting agent as a chemical liquid is added to the concentrated water from the RO membrane device E, and the washing efficiency for the RO membrane can be increased. For example, in a case where scale includes calcium carbonate ($CaCO_3$), the solubility of Ca can be increased by adding hydrochloric acid (HCl), sulfuric acid ($H_2SO_4$), or the like, which is an acidic chemical liquid, as the pH adjusting agent. For example, a pH meter (not illustrated in the diagram) is installed on the supply side Bs and the concentrated water side Bc of the RO membrane device B for measuring the pH of the supplied water and concentrated water of the RO membrane device B, and the difference of the measured pH is determined. It is preferable that from the difference between this difference in pH and the ideal difference in pH for every lapse of washing time, for example, proportional-integral-differential control (PID control) is carried out, and the injection amount of hydrochloric acid is controlled. PID control is a type of feedback control in control engineering and is a method of performing the control of an input value by means of three elements, namely, a deviation between an output value and a target value, an integral thereof, and a derivative. The above-described control is not limited to PID control, and the control of an input value may be I (integral) control, D (differential) control, P (deviation) control between an output value and a target value, or a combination thereof, and general feedback control can be used. Furthermore, in a case where the scale includes silica (silicon dioxide), the scale is alkalinized by adding an aqueous solution of sodium hydroxide (NaOH) as an alkaline chemical liquid, and the solubility of silica can be increased. In this case as well, as described above, the amount of addition of the alkaline chemical liquid can be controlled by controlling the pH of the permeated water.

<Recovery Rate of Water to be Treated in Reverse Osmosis Membrane>

Recovery rate (flow rate %) of water to be treated=[Amount of permeated water (flow rate)/amount of water to be treated (flow rate)]×100(%).

Hereinafter, the "% (percentage)" of the recovery rate represents "flow rate %". More efficient operation can also be achieved by increasing the proportion of the amount of permeated water that has permeated through the RO membrane device with respect to the amount of the water to be treated (flow rate) to be supplied to the RO membrane device (recovery rate of the water to be treated).

The recovery rate can be adjusted by performing adjustment of the output power of a pump inverter (not illustrated in the diagram) and adjustment of the degree of opening of a pressure adjusting valve. For example, by controlling the output power of the first pump P1 by a pump inverter, the flow rates of RO permeated water and RO concentrated water are controlled, and thus the recovery rate can be adjusted.

<Supply Pressure of Supplied Water Applied to RO Membrane>

In a case where the supply pressure at the time of supplying the water to be treated to the RO membrane device A is increased, it is preferable that the first pump P1 is operated by means of a pump inverter (not illustrated in the diagram) that functions as a flow rate control device in order to avoid a rapid increase in pressure. At that time, in order to prevent the occurrence of a rapid change in pressure, the output power (for example, speed of rotation) of an electric motor driving the pump is controlled by the pump inverter to increase the flow rate of the water to be treated, and thereby the water pressure can be increased. It is also preferable to control the second pump P2 by means of a pump inverter, similarly to the first pump P1.

Regarding the recovery rate of the water to be treated in an RO membrane device, in the case of production of pure water, from the viewpoint of cost reduction, the recovery rate is preferably 65% or higher, more preferably 80% or higher, and even more preferably 90% or higher. When the recovery rate is set to be "65% or higher", there is an advantage that a larger amount of permeated water is obtained with respect to the water to be treated. Furthermore, in the case of recovery of waste water, from the viewpoint that there is generally a large amount of materials causative of membrane pollution in the raw water, and the frequency of membrane washing and the number of times of switching are increased, the recovery rate is preferably 50% or higher, more preferably 70% or higher, and even more preferably 80% or higher.

The above-described RO membrane device is not particularly limited and may be any RO membrane device of extra low pressure type, ultralow pressure type, low pressure type, medium pressure type, and high pressure type. Examples of the RO membrane to be used for an RO membrane device include BW series (BW30XLE-440, BW30HR-440, BW30XFR-400/34i) (trade names) and SW series (SW30HRLE-440i, SW30ULE-440i) manufactured by the Dow Chemical Company; TMG series (TMG20, TMG-20D), TML series (TML20, TML-20D) (trade names), and TM800 series (TM820M-440, TM820K-400) manufactured by Toray Industries, Inc.; ES series (ES20-D8, ES15-D8) (trade names) manufactured by Nitto Denko Co., Ltd.; and LFC series (LFC3-LD), CPA series (CPAS-LD), and SWC series (SWC5-LD, SWC4-MAX) manufactured by HYDRANAUTICS, Inc.

The RO membrane device A has a single-stage configuration but may have a multi-stage configuration. In this case, it is preferable that RO membranes are disposed in series in multiple stages.

For example, with regard to the water treatment systems 1A and 1B, although not illustrated in the diagrams, the RO membrane device A may include a first-stage bank and a second-stage bank.

In the RO membrane device A, for example, the first-stage bank includes five vessels Va1 to Va5. Each of the concentrated water sides Ac of the vessels Va1 to Va5 in the first-stage bank is connected to the supply side of the second-stage bank. Each of the permeated water sides At of the vessels Va1 to Va5 is connected to the line AE. The respective concentrated water sides of a plurality of vessels in the second-stage bank join and are connected to the line AB, and each of the permeated water sides of a plurality of vessels in the second-stage bank is connected to the line AE. Other connection embodiments are similar to those of the water treatment systems 1A and 1B. As such, the concentrated water sides Ac of the first-stage bank are connected to the supply side of the bank of the second-stage bank. Alternatively, all of the concentrated water sides of the second-stage bank are connected to the line AB. Furthermore, all of the permeated water sides of the first-stage bank and all of the permeated water sides of the second-stage bank are connected to the line AE that is connected to the supply side Es of the RO membrane device E of the first and second embodiments.

Furthermore, it is preferable that the disposition of each gate valve and the opening and closing operation of each gate valve are similar to those of the first and second embodiments.

Regarding the RO membranes used for the RO membrane devices A, B, C, and E, the optimal membranes can be respectively selected, without being limited to the same brand, depending on the use application, the water quality of the water to be treated, the required water quality of the permeated water, and the recovery rate. For example, in the case of the water treatment systems 1A and 1B, high pressure type reverse osmosis membranes can be used for the RO membrane device E, and ultralow pressure type reverse osmosis membranes can be used for the RO membrane devices B and C. At this time, since the RO membrane devices B and C are switched and used, it is preferable that RO membranes of the same kind (for example, same product and same model number) are used.

The water treatment system of the present invention is effective for efficiently performing an RO membrane treatment for obtaining pure water with intended purity and washing against scaling on RO membranes. Scaling causes deterioration of the performance of a membrane, as sparingly-soluble components in raw water are deposited or precipitated on the membrane surface due to an RO membrane treatment. There are no particular limitations on the substances that scale on the membrane surface. Examples of scaling substances include calcium salts (calcium carbonate, calcium sulfate, calcium fluoride, and the like), magnesium salts (magnesium hydroxide and the like), barium salts (barium sulfate and the like), aluminum salts (aluminum phosphate, sodium hexafluoroaluminate, and the like), and silica.

[Water Treatment Method]

The water treatment method of the present invention can be carried out by the above-mentioned water treatment system of the present invention. That is, an embodiment of the water treatment method of the present invention includes removing the scale generated on the reverse osmosis membrane surface of a reverse osmosis membrane device B by the following water treatment (a1), by switching the water treatment (a1) to the following water treatment (b1), and then removing the scale generated on the reverse osmosis membrane surface of a reverse osmosis membrane device C by the following treatment (b1), by switching the water treatment (b1) to the water treatment (a1). This embodiment can be carried out by, for example, the water treatment system 1A illustrated in FIG. 1.

<Water Treatment (a1)>

Water to be treated is treated by a reverse osmosis membrane device A,
  the concentrated water from the reverse osmosis membrane device A is treated by a reverse osmosis membrane device B,
  the permeated water from the reverse osmosis membrane device A is treated by a reverse osmosis membrane device E, and
  the concentrated water from the reverse osmosis membrane device E is treated by a reverse osmosis membrane device C; and <Water Treatment (b1)> water to be treated is treated by a reverse osmosis membrane device A,
  the concentrated water from the reverse osmosis membrane device A is treated by a reverse osmosis membrane device C,
  the permeated water from the reverse osmosis membrane device A is treated by a reverse osmosis membrane device E, and
  the concentrated water from the reverse osmosis membrane device E is treated by a reverse osmosis membrane device B.

In the water treatment (a1), it is preferable that the scale generated on the reverse osmosis membrane surface of the reverse osmosis membrane device C by flow of the concentrated water from the reverse osmosis membrane device E is removed.

In the above-described embodiment of the water treatment method of the present invention, it is preferable that the water treatments (a1) and (b1) are alternately repeated. By doing so, the scale generated on the reverse osmosis membrane surface of the reverse osmosis membrane device C during the water treatment (b1) can be removed by flow of the concentrated water from the reverse osmosis membrane device E in the water treatment (a1), and the scale generated on the reverse osmosis membrane surface of the reverse osmosis membrane device B during the water treatment (a1) can be removed by flow of the concentrated water from the reverse osmosis membrane device E in the water treatment (b1).

Furthermore, another embodiment of the water treatment method of the present invention includes removing the scale generated on the reverse osmosis membrane surface of the reverse osmosis membrane device $B^{X2}$ by the following water treatment (a2), by switching the water treatment (a2) to the following water treatment (b2). This embodiment can be carried out by, for example, the water treatment system 1C illustrated in FIG. 3.

<Water Treatment (a2)>

Water to be treated is treated by a reverse osmosis membrane device A,
- the permeated water from the reverse osmosis membrane device A is treated by a reverse osmosis membrane device E,
- the concentrated water from the reverse osmosis membrane device E is treated by a reverse osmosis membrane device $B^{X1}$ selected from X units of reverse osmosis membrane devices B, and
- the concentrated water from the reverse osmosis membrane device A is treated by a reverse osmosis membrane device B other than the reverse osmosis membrane device $B^{X1}$; and <Water Treatment (b2)> water to be treated is treated by a reverse osmosis membrane device A,
- the permeated water from the reverse osmosis membrane device A is treated by a reverse osmosis membrane device E,
- the concentrated water from the reverse osmosis membrane device E is treated by a reverse osmosis membrane device $B^{X2}$ that is selected from X units of reverse osmosis membrane devices B and is different from the reverse osmosis membrane device $B^{X1}$, and
- the concentrated water from the reverse osmosis membrane device A is treated by a reverse osmosis membrane device B other than the reverse osmosis membrane device $B^{X2}$.

The reverse osmosis membrane device $B^{X2}$ is specifically selected from among the reverse osmosis membrane devices B except for the already selected reverse osmosis membrane device $B^{X1}$ among the reverse osmosis membrane devices B. For example, according to the embodiment illustrated in FIG. 3, in a case where the reverse osmosis membrane device B2 has already been selected, the reverse osmosis membrane device $B^{X2}$ is selected from reverse osmosis membrane devices B1 and B3 other than the reverse osmosis membrane device B2. For example, a reverse osmosis membrane device B3 is selected.

In the water treatment (a2), it is preferable that the scale generated on the reverse osmosis membrane surface of the reverse osmosis membrane device $B^{X1}$ by flow of the concentrated water from the reverse osmosis membrane device E is removed.

According to this embodiment, the scale generated on the reverse osmosis membrane surfaces of the reverse osmosis membrane devices B by supply of the concentrated water from the reverse osmosis membrane device A can be sequentially removed by sequentially switching the reverse osmosis membrane device B to which the concentrated water from the reverse osmosis membrane device E is supplied (that is, by switching the one reverse osmosis membrane device B to which the concentrated water from the reverse osmosis membrane device E is supplied among X units of the reverse osmosis membrane devices B, sequentially to another reverse osmosis membrane device B).

EXAMPLES

Example 1

In Example 1, a raw water having a Ca concentration of 20 ppm, a silica concentration of 15 ppm, an electrical conductivity of 200 μS/cm and pH=8.5 was subjected to an RO membrane treatment using the water treatment system 1A illustrated in FIG. 1. Regarding the RO membranes, ES20-D8 (trade name) manufactured by Nitto Denko Corp. was used. The recovery rate of the RO membrane device A was set to 50%, the recovery rate of the RO membrane device B was set to 50%, the recovery rate of the RO membrane device E was set to 90%, and the overall recovery rate of the system was set to 73%. The concentrated water from the RO membrane device A was supplied to the RO membrane device B, and the concentrated water from the RO membrane device E was supplied to the RO membrane device C. The permeated water from the RO membrane device B was caused to flow to the supply side of the RO membrane device E. The recovery rate of the RO membrane device C was set to 10% or less. The permeated water and concentrated water from the RO membrane device C were caused to flow to a raw water tank 51. The Langelier index of the concentrated water from the RO membrane device B was 1.0, and the water was under the conditions in which scale was likely to be generated. The water treatment system 1A was operated under the present conditions for 200 hours (h) by setting the first connection line. Subsequently, the line between the RO membrane device B and the RO membrane device C was switched (switched from the first connection line to the second connection line), the concentrated water from the RO membrane device E was supplied to the RO membrane device B, and the RO membrane device B was washed. The recovery rate of the RO membrane device B at this time was 10% or less, and the recovery rate of the RO membrane device C was set to 50%. Furthermore, after a lapse of 200 h, the line was switched again (switched from the second connection line to the first connection line), and a comparison was made between the amount of permeated water J of the RO membrane device B at the time of causing the concentrated water from the RO membrane device A to flow to the RO membrane device B and the initial (at the time of initiating operation) amount of permeated water J0 of the RO membrane device B. Furthermore, the system recovery rate was calculated from the amount of supplied water after a lapse of 400 h and the amount of permeated water thus obtained.

Example 2

In Example 2, the water treatment system 1A illustrated in FIG. 1 was used, hydrochloric acid was injected into the concentrated water from the RO membrane device E, and the pH of the concentrated water was adjusted to 5.5. Then, after the first connection line was switched to the second connection line, this concentrated water was supplied to the RO membrane device B, and the RO membrane device B was washed. Except for those, water flow was carried out under conditions similar to those of Example 1. That is, after a lapse of 200 h from the initiation of washing of the RO membrane device B, the line was switched again (switched from the second connection line to the first connection line), and a comparison was made between the amount of permeated water J of the RO membrane device B at the time of causing the concentrated water from the RO membrane device A to flow to the RO membrane device B and the initial (at the time of initiating operation) amount of permeated water J0 of the RO membrane device B. Furthermore, the system recovery rate was calculated from the amount of supplied water after a lapse of 400 h and the amount of permeated water thus obtained.

Example 3 pH meters were installed at the supplied water and the concentrated water from the RO membrane device B, and the difference in pH was measured. PID control was performed from the difference between this difference in pH and the ideal pH difference at every lapse of washing time, and the injection amount of hydrochloric acid was controlled. Except for those, water flow was carried out under conditions similar to those of Example 2. That is, after a lapse of 200 h from the initiation of washing of the RO membrane device B, the line was switched again (switched from the second connection line to the first connection line), and a comparison was made between the amount of permeated water J of the RO membrane device B at the time of causing the concentrated water from the RO membrane device A to flow to the RO membrane device B and the initial (at the time of initiating operation) amount of permeated water J0 of the RO membrane device B. Furthermore, the system recovery rate was calculated from the amount of supplied water after a lapse of 400 h and the amount of permeated water thus obtained.

Comparative Example 1

In Comparative Example 1, water flow was carried out under conditions similar to those of Example 1, except that only the first connection line was used without switching between the RO membrane devices B and C, and during 400 h, the concentrated water from the RO membrane device A was supplied to the RO membrane device B. After 400 h, a comparison was made between the amount of permeated water J from the RO membrane device B and the initial (at the time of initiating operation) amount of permeated water J0 from the RO membrane device B. Furthermore, the system recovery rate was calculated from the amount of supplied water after a lapse of 400 h and the amount of permeated water thus obtained.

Comparative Example 2

In Comparative Example 2, after operation for 200 h was carried out in the same manner as in Example 1 using the first connection line, the device was stopped for the moment, the concentrated water from the RO membrane device E was pressure-fed to the RO membrane device B at a pressure of 100 kPa for 1 h, and the RO membrane device B was washed. This operation was repeated twice. Subsequently, operation was carried out using the first connection line, and a comparison was made between the amount of permeated water J from the RO membrane device B and the initial (at the time of initiating operation) amount of permeated water J0 of the RO membrane device B (for convenience, referred to as J/J0 (%) after 400 h). Furthermore, the system recovery rate was calculated from the amount of supplied water after a lapse of 400 h and the amount of permeated water thus obtained.

The measurement results for the J/J0 (%) of the RO membrane device B after performing operation for 400 h and the system recovery rate are shown in Table 1.

TABLE 1

|  | J/J0 after operation time of 400 h (%) | System recovery rate (%) |
|---|---|---|
| Example 1 | 80 | 73 |
| Example 2 | 95 | 73 |
| Example 3 | 98 | 73 |
| Comparative Example 1 | 50 | 73 |
| Comparative Example 2 | 65 | 65 |

In Examples 1 to 3, the J/J0 after an operation time of 400 h was sufficiently restored. In Comparative Example 1, since washing by the concentrated water from the RO membrane device E was not carried out, the amount of permeated water remained at a reduced level. In Comparative Example 2, the washing time by permeated water was insufficient, the amount of permeated water was not sufficiently restored, it was necessary to blow the washing water, and the system recovery rate was also decreased.

Having described the invention as related to Examples thereof, it is our intention that the present invention not be limited by any of the details of the description, unless otherwise specified, but rather be construed broadly within its spirit and scope as set out in the accompanying claims.

The present application claims priority on Patent Application No. 2019-161359 filed in Japan on Sep. 4, 2019, which is herein incorporated by reference as a part of the present specification.

DESCRIPTION OF SYMBOLS 1, 1A, 1B Water treatment system
51 Raw water tank
53 Tank supply line
55 Raw water supply line
A, B, B1 to B3, C, E Reverse osmosis membrane device (RO membrane device)
As, Bs, Cs, Es Supply side
Ac, Bc, Cc, Ec Concentrated water side
At, Bt, Ct, Et Permeated water side
AB, AC, EB, EC Concentrated water flow line (line)
AE, BE, BE1 to 3, CE Permeated water flow line (line)
B1, B1, B11 Branch point
C1 to C5, C11 to C15 Confluence
LA Treated water line
LB Blow line
LF, LF1 to LF4, LF11 to LF19 Raw water return line
P1 First pump
P2 Second pump
V1 to V6, V11 to V19 Gate valve
VC1 to VC4 Control valve
Va1 to Va5, Vb1 to Vb3, Vc1, Ve1 Reverse osmosis membrane vessel (vessel)

The invention claimed is:

1. A water treatment method, comprising:

removing a scale generated on a surface of a reverse osmosis membrane of a reverse osmosis membrane device B by alternating, as needed, between a water treatment (a1) and a water treatment (b1):

<Water Treatment (a1)> a water to be treated is treated by a reverse osmosis membrane device A, concentrated water from the reverse osmosis membrane device A is treated by a reverse osmosis membrane device B, permeated water from the reverse osmosis membrane device A is treated by a reverse osmosis membrane device E, and post-permeate concentrated water from the reverse osmosis membrane device E is treated by a reverse osmosis membrane device C, wherein the post-permeate concentrated water is used as a washing water for washing and cleaning the reverse osmosis membrane device C; and <Water Treatment (b1)> a water to be treated is treated by a reverse osmosis membrane device A, concentrated water from the reverse osmosis membrane device A is treated by a reverse osmosis membrane device C, permeated water from the reverse osmosis membrane device A is treated by a reverse osmosis membrane device E, and post-permeate concentrated water from the reverse osmosis membrane device E is treated by a reverse osmosis membrane device B, wherein the post-permeate concentrated water is used as a washing water for washing and cleaning the reverse osmosis membrane device B.

2. The water treatment method according to claim 1, wherein the water treatments (a1) and (b1) are alternately repeated.

3. A water treatment method, comprising:

removing a scale generated on a surface of a reverse osmosis membrane of a reverse osmosis membrane device $B^{X2}$ by alternating, as needed, between a water treatment (a2) and a water treatment (b2):

<Water Treatment (a2)> a water to be treated is treated by a reverse osmosis membrane device A, permeated water from the reverse osmosis membrane device A is treated by a reverse osmosis membrane device E, post-permeate concentrated water from the reverse osmosis membrane device E is treated by a reverse osmosis membrane device $B^{X1}$ selected from X units of a reverse osmosis membrane device B, wherein the post-permeate concentrated water is used as a washing water for washing and cleaning the reverse osmosis membrane device $B^{X1}$, and concentrated water from the reverse osmosis membrane device A is treated by a reverse osmosis membrane device B other than the reverse osmosis membrane device $B^{X1}$; and <Water Treatment (b2)> a water to be treated is treated by a reverse osmosis membrane device A, permeated water from the reverse osmosis membrane device A is treated by a reverse osmosis membrane device E, post-permeate concentrated water from the reverse osmosis membrane device E is treated by a reverse osmosis membrane device $B^{X2}$ that is selected from X units of the reverse osmosis membrane device B and is different from the reverse osmosis membrane device $B^{X1}$, wherein the post-permeate concentrated water is used as a washing water for washing and cleaning the reverse osmosis membrane device $B^{X2}$, and concentrated water from the reverse osmosis membrane device A is treated by a reverse osmosis membrane device B other than the reverse osmosis membrane device $B^{X2}$.

4. The water treatment method according to claim 3, wherein the scale generated on the surface of the reverse osmosis membrane of the reverse osmosis membrane devices B by supplying the concentrated water from the reverse osmosis membrane device A, is sequentially removed by passing the post-permeate concentrated water from the reverse osmosis membrane device E, by sequentially switching the reverse osmosis membrane devices B to which the post-permeate concentrated water from the reverse osmosis membrane device E is supplied.

* * * * *